United States Patent
Ono et al.

(10) Patent No.: US 6,917,275 B2
(45) Date of Patent: Jul. 12, 2005

(54) MAGNETIC CORE AND MAGNETIC CORE-USE ADHESIVE RESIN COMPOSITION

(75) Inventors: Takashi Ono, Sodegaura (JP);
Mitsunobu Yoshida, Sodegaura (JP);
Nobuhiro Maruko, Sodegaura (JP);
Takashi Kuroki, Sodegaura (JP); Shoji Tamai, Sodegaura (JP); Kouichi Kanayama, Maizuru (JP); Hiroshi Watanabe, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 48 days.

(21) Appl. No.: 10/474,766
(22) PCT Filed: Apr. 12, 2002
(86) PCT No.: PCT/JP02/03660
§ 371 (c)(1),
(2), (4) Date: Oct. 10, 2003
(87) PCT Pub. No.: WO02/084676
PCT Pub. Date: Oct. 24, 2002

(65) Prior Publication Data
US 2004/0137247 A1 Jul. 15, 2004

(30) Foreign Application Priority Data
Apr. 13, 2001 (JP) ........................... 2001-115699
Feb. 25, 2002 (JP) ........................... 2002-047767

(51) Int. Cl.[7] .............................................. H01F 27/24
(52) U.S. Cl. ...................... 336/234; 336/233; 528/481
(58) Field of Search ............................... 336/233–234; 528/481; 428/469, 473.5; 430/531

(56) References Cited

U.S. PATENT DOCUMENTS 3,166,417 A * 1/1965 Gainsbury ................. 419/21
3,637,592 A * 1/1972 Berr .......................... 528/194
3,666,612 A * 5/1972 Angelo ...................... 428/212
5,008,370 A * 4/1991 Kashiwadate et al. ...... 528/481
6,562,473 B1 * 5/2003 Okabe et al. ............... 428/469

FOREIGN PATENT DOCUMENTS

| JP | 61-095029 | 5/1986 |
|---|---|---|
| JP | 61-208811 | 9/1986 |
| JP | 62-126615 | 6/1987 |
| JP | 63-094609 | 4/1988 |
| JP | 01-096910 | 4/1989 |
| JP | 02-251439 | 10/1990 |
| JP | 04-086254 | 3/1992 |
| JP | 04-339880 | 11/1992 |
| JP | 06-124841 | 5/1994 |
| JP | 07-331068 | 12/1995 |
| JP | 11-246759 | 9/1999 |
| JP | 2000-095997 | 4/2000 |

* cited by examiner

Primary Examiner—Tuyen T Nguyen
(74) Attorney, Agent, or Firm—Burns, Doane, Swecker & Mathis, LLP

(57) ABSTRACT

The present invention provides a magnetic core whose outer surface has been coated without handling brittle ribbon to thereby impart insulating properties and shape retention properties to the magnetic core after annealing heat treatment, and further provides an adhesive resin composition for a magnetic core, which is useful for efficiently producing the above-mentioned magnetic core without using any organic solvent and which per se is stable to heat and elapse of time. By forming a coating film having a certain thickness or more on an outer surface using a composition containing a resin of specific properties, there can be obtained a magnetic core whose outer surface has been coated without handling brittle ribbon to thereby impart insulating properties and shape retention properties to the magnetic core after annealing heat treatment. The adhesive resin composition containing particles of a resin having specific properties is useful for efficiently producing the above-mentioned excellent magnetic core without using any organic solvent, and this composition is stable to heat and elapse of time.

14 Claims, 4 Drawing Sheets

MAGNETIC CORE AND MAGNETIC CORE-USE ADHESIVE RESIN COMPOSITION

TECHNICAL FIELD

The present invention relates to a magnetic core comprising a core material made of a laminate of an amorphous alloy ribbon and a coated material arranged on an outer surface of the core material, a process for producing the magnetic core, and an adhesive resin composition used for producing the magnetic core.

BACKGROUND ART

An amorphous alloy is a non-crystalline solid produced by rapidly cooling a starting material, such as iron, boron or silicon, from its molten state, and such an amorphous alloy can be usually obtained as a ribbon having a thickness of usually about 0.01 to 0.1 mm. The amorphous alloy has a random structure with no regularity of atomic configuration and has excellent properties as a soft magnetic material, such as high magnetic permeability, small coercivity force, and usability even in a high-frequency region because of a wide region of applicable frequencies. In case of the amorphous alloy, further, the energy loss (hysteresis loss) that is produced when the magnetic flux passes through is small and the thickness of a ribbon of the amorphous alloy is smaller than that of a silicon steel belt, so that the core loss (sum of hysteresis loss and eddy current loss) can be reduced. On this account, magnetic cores produced by laminating the amorphous alloy ribbons are used as, for example, transformers in many electric and electronic instruments making the best use of their excellent properties, and they greatly contribute to not only magnetic properties but also miniaturization or weight reduction of parts. Moreover, transformers using amorphous ribbon core that is one of magnetic cores have been recently paid much attention from the viewpoint of energy saving.

Magnetic cores using amorphous alloy ribbons are generally produced in the following manner.

First, an amorphous alloy ribbon is rolled or superposed one upon another to form a magnetic core precursor in a given shape. Then, in order to allow the resulting magnetic core to exhibit specific magnetic properties, the precursor is subjected to a prescribed annealing heat treatment. Although the conditions of the annealing heat treatment vary depending upon the desired magnetic properties, this treatment is generally carried out under the conditions of a temperature of about 330 to 440° C. and an annealing time of 0.1 to 100 hours in an inert atmosphere.

Through the annealing heat treatment, the amorphous alloy ribbon becomes an extremely brittle ribbon. In the production of the magnetic core, therefore, it is an important problem to retain the shape of the magnetic core having been subjected to the annealing heat treatment and to prevent breakage thereof. It is known that in the case where the shape of the magnetic core having been subjected to the annealing heat treatment is intended to be retained, if an excess stress is applied to the amorphous alloy ribbon for forming the magnetic core, the hysteresis loss that is one constituent of the core loss is increased and exerts an influence on the properties of the magnetic core, and the influence becomes large particularly in the low-frequency region. For retaining the shape of the magnetic core, therefore, it is necessary to take measures sufficiently considering change of properties of the magnetic core caused by the method for retaining the shape of the magnetic core.

In the case where the magnetic core produced as above is used as a part of a transformer by coiling a conductor wire around the magnetic core, in order to secure insulation between the magnetic core and the conductor wire, or in order to prevent breakage of the amorphous alloy ribbon that is made brittle by the annealing heat treatment and to impart excellent shape retention properties to the magnetic core, there has been heretofore generally used a method of introducing the magnetic core having been subjected to the annealing heat treatment into a case made of a resin or the like or a method of coating the outer surface of the magnetic core having been subjected to the annealing heat treatment with a thermosetting resin such as an epoxy resin by electrostatic powder coating. In the method of using a case, however, the case needs to be made larger than the magnetic core from the viewpoint of workability, and the magnetic core with the case becomes bulky as compared with the original magnetic core. Such a magnetic core is unfavorable as an electronic part that needs to be miniaturized. Moreover, a mold to produce a case is necessary, and from the viewpoint of cost, this method is only applicable to a magnetic core of certain shape which is consumed in large amounts. Considering preparation of molds for producing many kinds of magnetic cores of different shapes in small amounts, this method is of no practical use.

On the other hand, in the coating method using a thermosetting resin such as an epoxy resin, problems of the above method using a case, such as a problem of miniaturization and a problem of small amounts and various kinds, can be solved. In this coating method, however, the magnetic core having been subjected to annealing heat treatment and cooling is coated with the thermosetting resin, so that the core loss properties are deteriorated. Moreover, heat treatments of two times, namely, heat treatment for annealing and heat treatment for resin setting, must be carried out, and this makes the production process complicated.

Some of large-sized magnetic cores, e.g., amorphous ribbon cores used for transformers, weigh more than 100 kg, and in the heavy substances, there are always involved difficulties in delicate handling or risks of partial fine breakage attributable to their own weights. Further, in order to cure the thermosetting resin applied, it is necessary to perform heat treatment again after the annealing heat treatment. This operation is troublesome, and installment of an exclusive oven is necessary. Furthermore, there are other problems. For example, it is difficult to increase viscosity of the resin, and because of the core material's own heavy weight, it is also difficult to apply the resin with changing the position of the coating surface so that the resin can be applied in an optimum state, and hence the coating operation is restricted.

There has been disclosed another method wherein amorphous alloy ribbons are laminated, then the laminate is coated with a varnish containing as a main component an organic substance capable of withstanding the annealing temperature, such as a polyimide resin, and the laminate with the varnish is heated to perform curing of the resin and annealing heat treatment at the same time (Japanese Patent Laid-Open Publication No. 126615/1987). According to this method, the surface of the magnetic core after the annealing treatment is protected by the thermally cured resin and the shape of the magnetic core is retained, so that the magnetic core constituted of the annealed brittle amorphous alloy ribbons can be more easily handled than before, and the operational problem of the magnetic core can be solved. In addition, curing of the varnish can be carried out simultaneously with annealing, and the mechanical strain of the magnetic core due to curing of the varnish can be relatively reduced. Therefore, variability of the core loss can be made smaller as compared with the aforesaid method wherein the magnetic core having been subjected to annealing and cooling is coated with the thermosetting resin of high shrink properties, such as an epoxy resin.

In this method, however, an organic solvent solution of a heat-resistant resin is used, so that it is difficult to form a resin layer of sufficient thickness on the outer surface of the magnetic core. Moreover, because an organic solvent solution (liquid varnish) of a heat-resistant resin is used, the varnish penetrates between layers of the amorphous alloy ribbons, and because of strain due to curing shrinkage of the resin, unnecessary stress is applied to the amorphous alloy ribbons to thereby produce a core loss. To cope with this, a means of fastening the laminate with an iron plate or the like is also disclosed. The means, however, needs extra instrument and operation. Further, the effects are not satisfactory, and the core loss cannot be reduced to the practical level. Furthermore, because of low viscosity of the organic solvent solution (varnish) of a heat-resistant resin, it is difficult to effectively coat the surface of the laminate (core) of the amorphous alloy ribbons. Therefore, insulating performance between the laminate and a conductor wire coiled around the laminate is liable to become unstable. The varnish is prepared by dissolving a heat-resistant resin in an organic solvent, such as N,N-dimethylacetamide, N-methylpyrrolidone, dimethylimidazolidinone or dimethyl sulfoxide. Although the organic solvent exhibits excellent dissolving power for the heat-resistant resin, it has a fear of exerting an evil influence on the human body. In the production of the magnetic core using varnish, therefore, sufficient care should be taken in handling of the varnish or diffusion of the varnish into the atmosphere. For example, complicated equipment is necessary, and considerably great investment in the equipment is necessary. Because the properties of the varnish are liable to be deteriorated with time, special equipment for storing the varnish, such as refrigerating equipment, is necessary, and it is very difficult to maintain the varnish in a favorable state.

In order to relax the shrinkage strain caused by curing the heat-resistant resin in the use of such a varnish as mentioned above, a method of reducing a stress by the use of a varnish of a siloxane-modified polyimde resin having a low elastic modulus has been disclosed (Japanese Patent Laid-Open Publication No. 251439/1990).

Although the core loss can be improved by decreasing the elastic modulus, satisfactory effects cannot be obtained. Moreover, if the siloxane-modified polyimide resin is exposed to a temperature of 330 to 440° C. for a period of 0.1 to 100 hours, said conditions being those for annealing the magnetic core, a part of the resin is decomposed because of its low heat resistance, and this causes a problem of shape retention particularly in a large-sized magnetic core such as an amorphous ribbon core.

It has been heretofore thought that if a resin having such heat resistance as to withstand the annealing conditions in the production of a magnetic core and if the annealing and the curing of the resin are carried out at the same time, the shape of the annealed magnetic core can be retained by the resin and the annealed magnetic core can be protected by the resin present on the surface. It has been also thought that handling of the thus treated magnetic core becomes easier and there is a possibility of reducing the core loss.

In the use of the above-mentioned varnish, however, the amount of the varnish that penetrates between layers of the amorphous alloy ribbons is much larger than expected, and the stress applied to the amorphous alloy ribbons by the curing shrinkage of the resin is considerably large. Therefore, it is difficult to obtain a magnetic core having satisfactory properties. Moreover, because the varnish contains a large amount of an organic solvent, it is very difficult to form a resin film of enough thickness to effectively protect a laminate of the amorphous alloy ribbons having been made brittle by annealing, and in some cases, even a film thickness for securing insulation between the magnetic core and a conductor wire wound around the magnetic core cannot be obtained.

The conventional varnish contains a large amount of an organic solvent. Therefore, taking influences of the varnish on the working atmosphere and the natural environment into consideration, great equipment becomes necessary. The conventional varnish itself has a problem of stability to heat and elapse of time and also has a problem of sagging because of low viscosity. When the varnish is used, the resin penetrates and is cured between layers of the laminate of the amorphous alloy ribbons, so that unnecessary stress is applied to the laminate of the amorphous alloy ribbons to produce core loss, and the magnetic core having such core loss becomes a problem in the practical use.

DISCLOSURE OF THE INVENTION

It is an object of the present invention to provide a magnetic core in which an outer surface of an amorphous alloy ribbon has been coated without handling the amorphous alloy ribbon having been made brittle by annealing to thereby impart insulating properties and shape retention properties to the magnetic core after annealing heat treatment.

It is another object of the present invention to provide a magnetic core having low core loss and high insulating properties, wherein a core material made of an amorphous alloy ribbon is imparted with excellent magnetic properties.

It is a further object of the present invention to provide an adhesive resin composition for a magnetic core, which is used for producing the above-mentioned magnetic core.

It is a still further object of the present invention to provide a process for producing the above-mentioned magnetic core, and a magnetic core obtained by the process.

It is a still further object of the present invention to provide an adhesive resin composition for a magnetic core, which can efficiently produce a magnetic core without using an organic solvent and which per se is stable to heat and elapse of time.

The magnetic core according to the invention is a magnetic core comprising a core material made of a laminate of an amorphous alloy ribbon and a resin-containing coated material with which at least a part of an outer surface of the core material is coated, wherein the resin-containing coated material formed on the outer surface of the core material has a thickness of not less than 10 µm, and a resin for constituting the resin-containing coated material has a tensile strength, as measured at 30° C. after annealing of 365° C. and 2 hours in a nitrogen atmosphere, of not less than 30 MPa and has a loss in weight, due to thermal decomposition after annealing of 365° C. and 2 hours in a nitrogen atmosphere, of not more than 2% by weight.

In the present invention, the resin for constituting the resin-containing coated material is preferably one or more thermoplastic resins selected from a polyimide resin, a polyether imide resin, a polyamide-imide resin, a polyamide resin, a polysulfone resin and a polyether ketone resin.

In the present invention, the resin for constituting the resin-containing coated material is preferably one or more thermoplastic resins selected from resins having, in their main chain skeletons, recurring units represented by the following formulas (1) to (10):

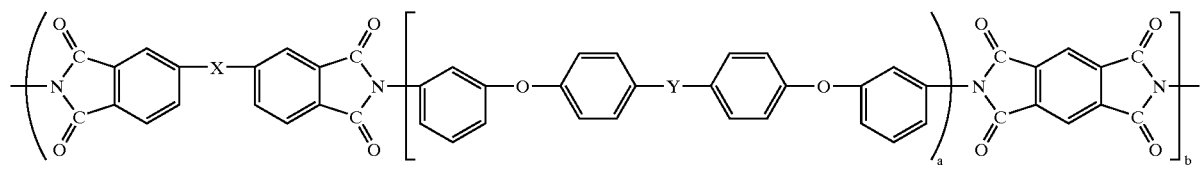

(1)

wherein a and b are numbers satisfying the conditions of a+b=1, $0 \leq a \leq 1$ and $0 \leq b \leq 1$, and X and Y are each independently a bond group capable of forming one bond selected from the group consisting of a direct bond, an ether bond, an isopropylidene bond, a sulfide bond, a sulfone bond and a carbonyl bond and may be the same or different;

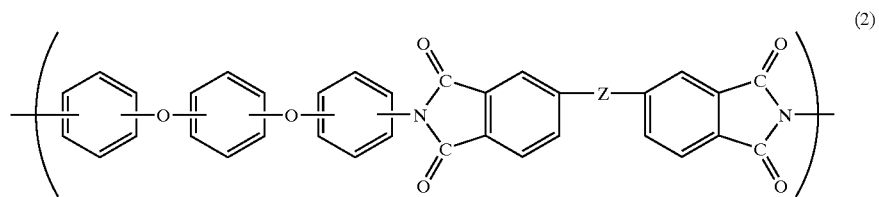

(2)

wherein Z is a bond group selected from the group consisting of a direct bond, an ether bond, an isopropylidene bond, a sulfide bond, a sulfone bond and a carbonyl bond;

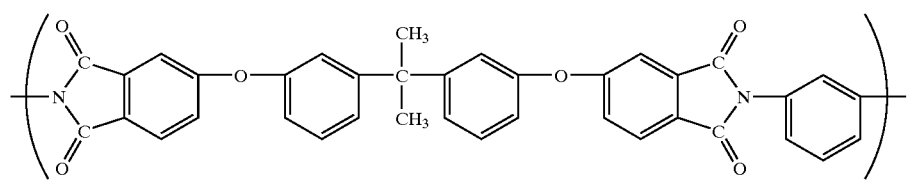

(3)

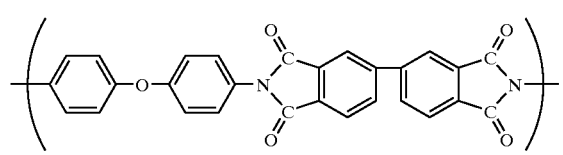

(4)

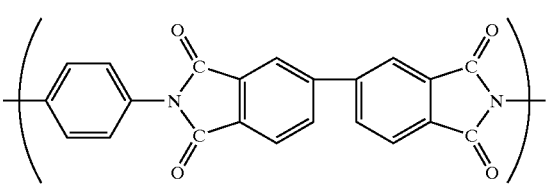

(5)

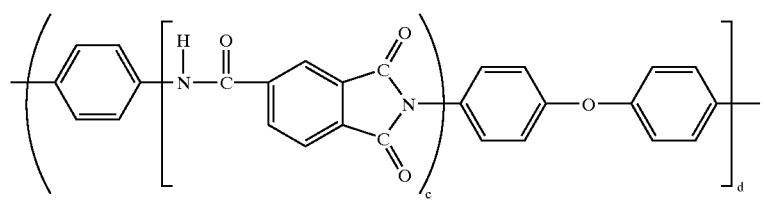

(6)

wherein c and d are numbers satisfying the conditions of c+d=1, 0≦c≦1 and 0≦d≦1;

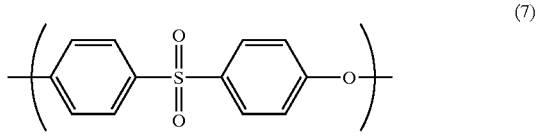

(7)

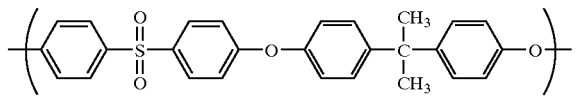

(8)

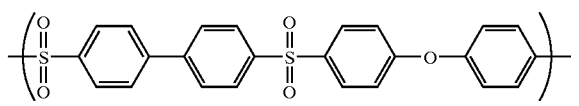

(9)

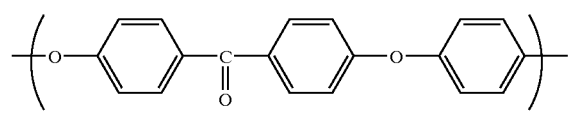

(10)

The magnetic core according to the invention is a magnetic core comprising a core material made of a laminate of an amorphous alloy ribbon and a resin-containing coated material with which at least a part of an outer surface of the core material is coated, wherein an area of not more than 10% of the whole surface area of the amorphous alloy ribbon is coated with the resin-containing coated material, and a resin for constituting the resin-containing coated material has a tensile strength, as measured at 30° C. after annealing of 365° C. and 2 hours in a nitrogen atmosphere, of not less than 30 MPa and has a loss in weight, due to thermal decomposition after annealing of 365° C. and 2 hours in a nitrogen atmosphere, of not more than 2% by weight.

In the present invention, the resin for constituting the resin-containing coated material is preferably one or more thermoplastic resins selected from the group consisting of a polyimide resin, a polyether imide resin, a polyamide-imide resin, a polyamide resin, a polysulfone resin and a polyether ketone resin.

In the present invention, the resin for constituting the resin-containing coated material is preferably one or more thermoplastic resins selected from resins having, in their main chain skeletons, recurring units represented by the aforesaid formulas (1) to (10).

The magnetic core of the invention is preferably a magnetic core comprising a core material made of a laminate of an amorphous alloy ribbon and a resin-containing coated material with which at least a part of an outer surface of the core material is coated, wherein the resin-containing coated material formed on the outer surface of the core material has a thickness of not less than 10 μm, an area of not more than 10% of the whole surface area of the amorphous alloy ribbon is coated with the resin-containing coated material, and a resin for constituting the resin-containing coated material has a tensile strength, as measured at 30° C. after annealing of 365° C. and 2 hours in a nitrogen atmosphere, of not less than 30 MPa and has a loss in weight, due to thermal decomposition after annealing of 365° C. and 2 hours in a nitrogen atmosphere, of not more than 2% by weight.

The adhesive resin composition for a magnetic core according to the invention is an adhesive resin composition containing particles of a resin, wherein the resin has both of the following two properties:

(1) the resin has a tensile strength, as measured at 30° C. after annealing of 365° C. and 2 hours in a nitrogen atmosphere, of not less than 30 MPa and has a loss in weight, due to thermal decomposition after annealing of 365° C. and 2 hours in a nitrogen atmosphere, of not more than 2% by weight; and (2) the resin is a thermoplastic resin and has a melt viscosity at 365° C. of 20 to 50000 Pa·s.

The adhesive resin composition for a magnetic core preferably contains a liquid which does not substantially dissolve the resin contained in the composition.

The liquid contained in the adhesive resin composition for a magnetic core is preferably at least one liquid selected from the group consisting of water, methanol and ethanol.

The resin used herein is preferably at least one thermoplastic resin selected from the group consisting of a polyimide resin, a polyether imide resin, a polyamide-imide resin, a polyamide resin, a polysulfone resin and a polyether ketone resin.

The thermoplastic resin is preferably one or more thermoplastic resins selected from resins having, in their main chain skeletons, recurring units represented by the aforesaid formulas (1) to (10).

The magnetic core according to the invention is a magnetic core produced by the use of the aforesaid adhesive resin composition.

The magnetic core of the invention can be produced by a process comprising providing the aforesaid adhesive resin composition to a core material made of a laminate of an amorphous alloy ribbon having been not subjected to annealing heat treatment, and then performing annealing heat treatment, wherein the adhesion coating of the core material with the adhesive resin composition and the annealing heat treatment are carried out in the same step.

BEST MODE FOR CARRYING OUT THE INVENTION

The magnetic core, the adhesive resin composition for a magnetic core and a process for producing a magnetic core according to the invention are described in detail hereinafter with reference to their best modes.

The magnetic core of the invention comprises a core material prepared by laminating an amorphous alloy ribbon and a coated material composed of a composition containing a specific resin and formed on a part or the whole of an outer surface of the core material.

Figure 5:
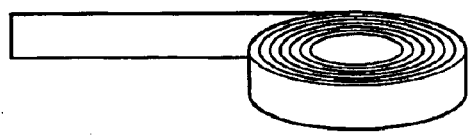
FIG. 5 is a view showing an example of an amorphous alloy ribbon.

The core material for constituting the magnetic core of the invention is obtained by laminating a ribbon of an amorphous alloy, as shown in FIG. 5. This amorphous alloy is a soft magnetic material, and examples thereof include amorphous metal materials, such as Fe-based amorphous metal materials and Co-based amorphous metal materials, and nano-crystalline metal materials, such as Fe-based nano-crystalline metal materials and Co-based nano-crystalline metal materials.

Examples of the Fe-based amorphous metal materials include Fe-semimetal system amorphous metal materials, such as Fe—Si—B system amorphous metal material, Fe—B system amorphous metal material and Fe—P—C system amorphous metal material; and Fe-transition metal system amorphous metal materials, such as Fe—Zr system amorphous metal material, Fe—Hf system amorphous metal material and Fe—Ti system amorphous metal material. Examples of the Co-based amorphous metal materials include Co—Si—B system amorphous metal material and Co—B system amorphous metal material.

Examples of the nano-crystalline metal materials obtained by crystallizing amorphous metal materials to nano-size by heat treatment include Fe—Si—B—Cu—Nb system amorphous metal material, Fe—B—Cu—Nb system amorphous metal material, Fe—Zr—B—(Cu) system amorphous metal material, Fe—Zr—Nb—B—(Cu) system amorphous metal material, Fe—Zr—P—(Cu) system amorphous metal material, Fe—Zr—Nb—P—(Cu) system amorphous metal material, Fe—Ta—C system amorphous metal material, Fe—Al—Si—Nb—B system amorphous metal material, Fe—Al—Si—Ni—Nb—B system amorphous metal material, Fe—Al—Nb—B system amorphous metal material and Co—Ta—C system amorphous metal material.

In order to allow the above materials to exhibit specific magnetic properties, they are all usually subjected to annealing heat treatment under the prescribed conditions prior to use.

Although the conditions of the annealing heat treatment vary depending upon the type of the material used and the magnetic properties to be exhibited, the amorphous metal material is preferably heated at a temperature of about 300 to 500° C., and the nano-crystalline metal material is preferably heated at a temperature of about 400 to 700° C.

In the magnetic core of the invention, the thickness of the amorphous alloy ribbon is in the range of preferably 10 to 100 $\mu$m, more preferably 10 to 40 $\mu$m. Although the width of the amorphous alloy ribbon used in the invention can be appropriately determined according to the size of the magnetic core to be produced, it is in the range of usually 1 to 2000 mm, preferably 1 to 500 mm. According to the present invention, magnetic cores of various sizes from those of extremely small size to those of extremely large size such as a transformer can be produced.

There is no specific limitation on the method to laminate the amorphous alloy ribbon, and a method suitable for the shape of the magnetic core to be produced is adoptable. In general, a method of rolling the amorphous alloy ribbon of a tape form and a method of superposing the amorphous alloy ribbons of given size one upon another are employable.

In the magnetic core of the invention, the number of laminations (layers) of the amorphous alloy ribbon can be appropriately determined according to the magnetic core to be produced, but in general, 5 to 50000 layers, preferably 10 to 10000 layers, can be laminated. The thickness of the core material formed by laminating the amorphous alloy ribbon is usually not less than 0.1 mm, preferably 0.2 to 500 mm. Thus, the magnetic core of the invention can be readily produced without using any special container or the like in spite that it can take various shapes and sizes.

Figure 1:
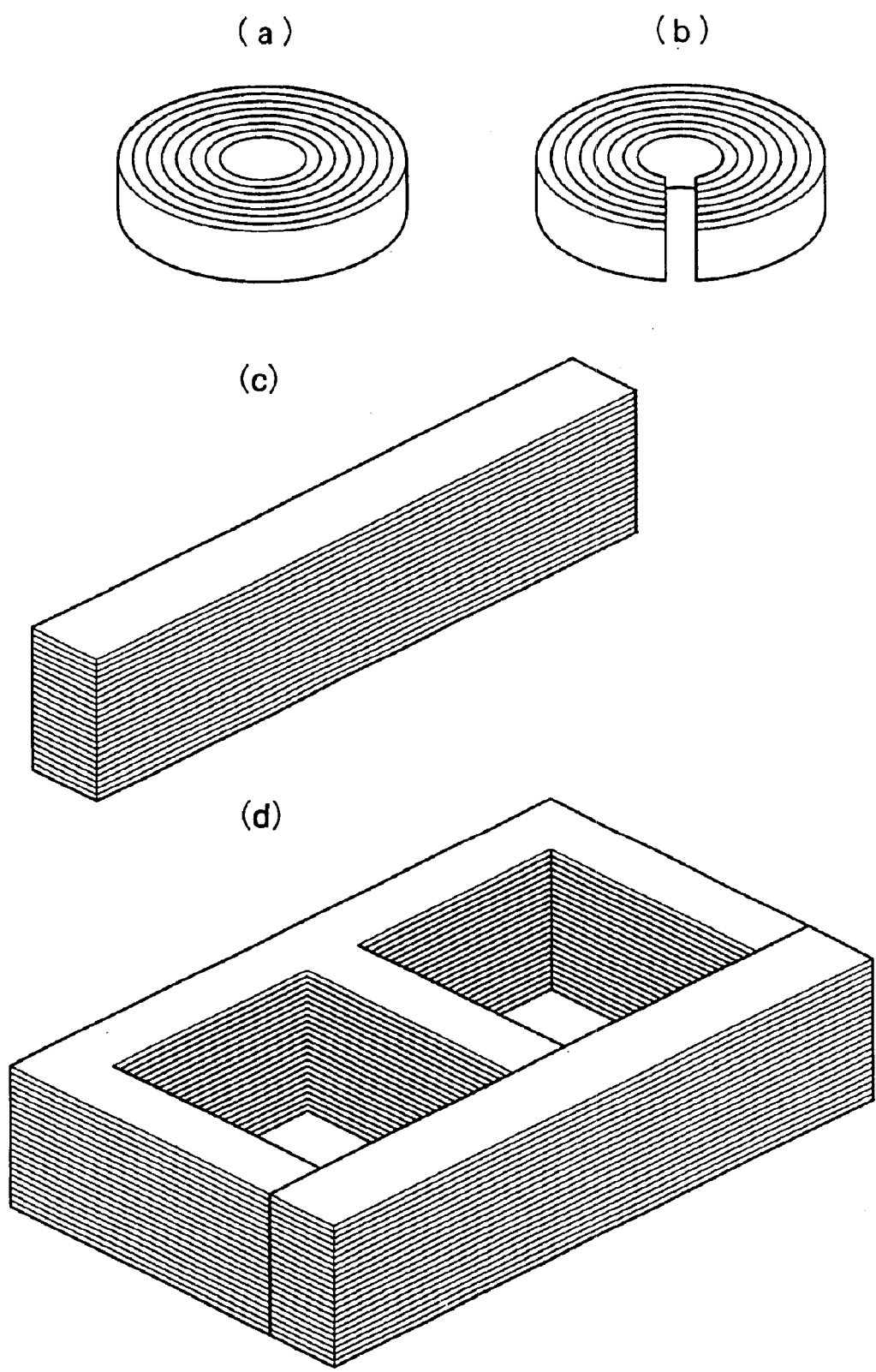
FIG. 1 is a view showing examples of shapes of core materials using an amorphous alloy ribbon.

FIG. 1 shows examples of shapes of the core materials using the amorphous alloy ribbon. In FIG. 1, (a) designates a toroidal core, (b) designates a gap core wherein a part of a toroidal core is cut off, (c) designates a bar core wherein strips of amorphous alloy ribbons are laminated, and (d) designates an EI core wherein laminated amorphous alloy ribbons are punched. In the present invention, the core material may be in any of these shapes.

For example, the toroidal core designated by (a) in FIG. 1 can be formed by rolling the amorphous alloy ribbon. The gap core designated by (b) can be formed by cutting off a part of the rolled toroidal core. The bar core and the EI core can be formed by laminating the amorphous alloy ribbons and punching the resulting laminate to a given shape.

The magnetic core of the invention has a core material obtained by, for example, laminating the amorphous alloy ribbons and forming the laminate to the desired shape as described above, and the outer surface of the core material is coated with a coated material comprising a heat-resistant resin having the prescribed adhesion properties.

The resin for constituting the coated material is a thermoplastic resin having a glass transition temperature (Tg) of not lower than 120° C., preferably not lower than 135° C., more preferably not lower than 150° C., and is a heat-resistant resin having a viscosity at 350° C. of not more than 10000 Pa·s, preferably not more than 8000 Pa·s, more preferably not more than 5000 Pa·s, and having a thermal decomposition temperature, at which the weight measured at room temperature is decreased by 5%, of not lower than 350° C., preferably not lower than 450° C., more preferably not lower than 500° C. In spite that this resin is thermoplastic, it has extremely high heat resistance. The 5% loss in weight attributable to thermal decomposition is a value measured by a thermobalance or the like in a nitrogen atmosphere. The viscosity of the resin can be measured by, for example, a Shimadzu flow tester CFT-500D/100.

The resin mentioned above is pulverized to a powder, and the powder is allowed to adhere onto the outer surface of the core material and hardened, whereby the coated material is formed.

In the magnetic core of the invention, a part or the whole of the outer surface of the core material is coated with a composition containing the resin. The coating is carried out on a part or the whole of the outer surface, and the proportion of the coated area is not restricted provided that insulation between the magnetic core and a conductor wire wound around the magnetic core can be obtained and shape retention of the magnetic core can be secured. In general, corners of the magnetic core are most important places to be imparted with insulating properties, so that they are preferably coated with the composition.

In the magnetic core of the invention, the core material is coated with a composition containing a resin having specific properties, as described above. In the composition, the resin having specific properties plays an important roll to attain the effects of the invention, and the components other than the resin, which may be contained in the composition, are not specifically restricted provided that the effects of the invention are not impaired. For example, inorganic filler and other resins may be contained. The coated material may be constituted of only the above resin. Although the proportion occupied by the resin in the composition is not specifically defined, it is preferably not less than 20% by weight, more preferably not less than 50% by weight.

The resin for constituting the coated material in the magnetic core of the invention has a tensile strength, as measured at 30° C. after annealing of 365° C. and 2 hours in a nitrogen atmosphere, of not less than 30 MPa, preferably 35 to 300 MPa, particularly preferably 40 to 250 MPa, and has a loss in weight, due to thermal decomposition after annealing of 365° C. and 2 hours in a nitrogen atmosphere, of not more than 2% by weight, preferably not more than 1% by weight. If the tensile strength as measured at 30° C. after annealing of 365° C. and 2 hours in a nitrogen atmosphere is less than 30 MPa, the coating properties become insufficient to sometimes cause a problem of insulating properties. Moreover, there is a possibility of a problem of shape retention of the magnetic core. For example, when the core material of the magnetic core of the invention is formed by rolling the amorphous alloy ribbon, as designated by (a) in FIG. 1, it is necessary to arrange the coated material on the outer surface (side surfaces and outermost peripheral surface of the rolled amorphous alloy ribbon) of the core material to thereby bind the rolled core material with the coated material so that the rolled core material should not unroll. However, if the tensile strength is less than the above-defined value, the core material cannot be bound sufficiently in some cases.

If the loss in weight due to thermal decomposition after annealing of 365° C. and 2 hours in a nitrogen atmosphere exceeds 2% by weight, insulating properties and shape retention are lowered similarly to the above. Moreover, volatile components or carbon-containing substances produced by decomposition are liable to stain an oven used for the annealing heat treatment. The upper limit of the tensile strength as measured at 30° C. after annealing of 365° C. and 2 hours in a nitrogen atmosphere is not specifically restricted, but if the tensile strength is too high, there is a possibility of cracking of the coating film. Therefore, the tensile strength is preferably not more than 300 MPa, more preferably not more than 250 MPa.

In the present invention, the tensile strength at 30° C. after annealing of 365° C. and 2 hours in a nitrogen atmosphere can be measured in accordance with the method defined by JIS K 7127.

In this method, first, a film of a given thickness is formed by a usual method such as hot pressing or casting. More specifically, for forming a film by hot pressing, particles or pellets of the resin are previously dried at 100 to 200° C. for about 1 to 10 hours in a stream of an inert gas such as nitrogen, and then they are subjected to hot pressing at a temperature higher than the glass transition temperature of the resin by about 10 to 150° C., preferably about 30 to 100° C., to form a film from which a specimen is to be cut. The temperature and the time for the hot pressing need to be so determined that the heat does not substantially exert an influence on the resin properties. For forming a film by casting, the resin is dissolved in an organic solvent capable of homogeneously dissolving the resin in a concentration of 1 to 50% by weight, preferably 5 to 30% by weight, and the resulting solution is cast in a thickness of about 10 to 2000 μm on a flat glass substrate by the use of a bar coater, a spin coater or the like. The thickness of the specimen varies depending upon the thickness of the film cast on the substrate, the type of the resin, the type of the solvent, the amount of the resin in the solution, etc., and besides, it is influenced also by the boiling point of the solvent. Therefore, the conditions are selected so that a specimen of uniform and desired thickness can be obtained. The film cast on the substrate is then dried together with the substrate in a drying oven under the conditions capable of satisfactorily removing the organic solvent. In order to prevent foaming, it is preferable that the film is heated up to the boiling temperature of the organic solvent at a rate of about 1 to 30° C./min, held at about the boiling temperature for several hours and then dried under the conditions capable of satisfactorily removing the organic solvent. The temperature and the time for drying need to be so determined that the heat does not substantially exert an influence on the resin properties. A film prepared by any of the above methods can be used for the measurement in the present invention, but a film obtained by hot pressing is preferable. If the organic solvent remains in the film used for the measurement, there is a fear of an evil influence on the results. Therefore, it is preferable that the organic solvent does not substantially remain, that is, the residue is less than 0.01% by weight based on the resin.

The measurement of the tensile strength in the invention is carried out in accordance with JIS K 7127. The thickness of the film is not defined in this standard and it has only to be not more than 1 mm. In the present invention, the thickness of the film for the measurement is preferably in the range of 100 to 300 μm, without limiting thereto. The film prepared as above is heated at a rate of 10° C./min in the temperature range of room temperature to 365° C. and allowed to stand at 365° C. for 2 hours. Thereafter, the film is slowly cooled to room temperature and cut out by punching or the like to a specimen's shape of the standard. Then, the tensile strength of the resulting specimen is measured. In the present invention, a specimen of No. 3 shape is adopted.

In the present invention, measurement of the loss in weight due to thermal decomposition after annealing of 365° C. and 2 hours in a nitrogen atmosphere is carried out by usual thermogravimetry (TG method). A resin sample is dried at 200° C. for 2 hours in a stream of nitrogen prior to the measurement. The resin sample is set in a thermogravimeter and heated at a rate of 10° C./min in a nitrogen atmosphere. When a temperature of 365° C. is reached, this temperature is maintained for 2 hours. The weight in loss due to thermal decomposition is a ratio of the sample weight decreased during the period of 2 hours at 365° C. to the sample weight given when a temperature of 365° C. is reached.

Examples of the resins employable in the invention include a polyimide resin, a polyether imide resin, a polyamide-imide resin, a polyamide resin, a polysulfone resin and a polyether ketone resin. One resin selected from these resins may be used, or two or more resins selected from these resins may be used in combination.

More specifically, thermoplastic resins having, in their main chain skeletons, recurring units represented by the following chemical formulas (1) to (10) can be preferably employed as the resins for the present invention. One resin selected from these resins may be used, or two or more resins selected from these resins may be used in combination.

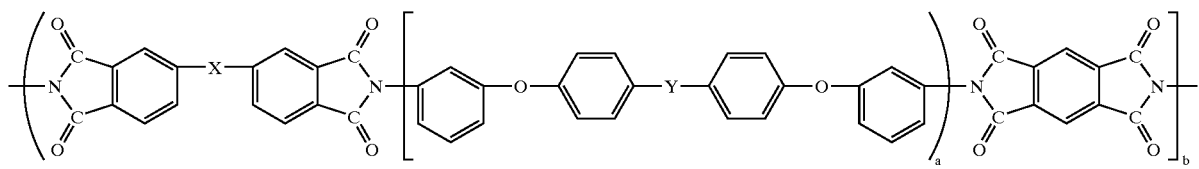

In the formula (1), a and b are numbers satisfying the conditions of a+b=1, $0 \leq a \leq 1$ and $0 \leq b \leq 1$, and X and Y are each independently a bond group selected from a direct bond, an ether bond, an isopropylidene bond, a sulfide bond, a sulfone bond and a carbonyl bond and may be the same or different.

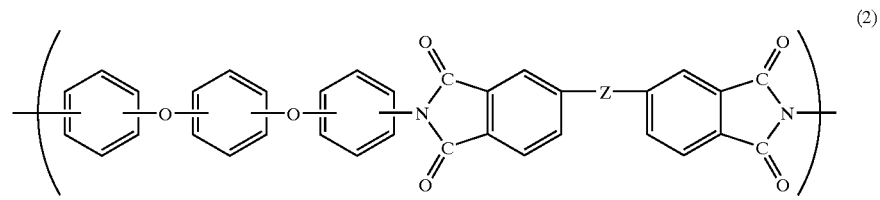

In the formula (2), Z is a bond group selected from a direct bond, an ether bond, an isopropylidene bond, a sulfide bond, a sulfone bond and a carbonyl bond.

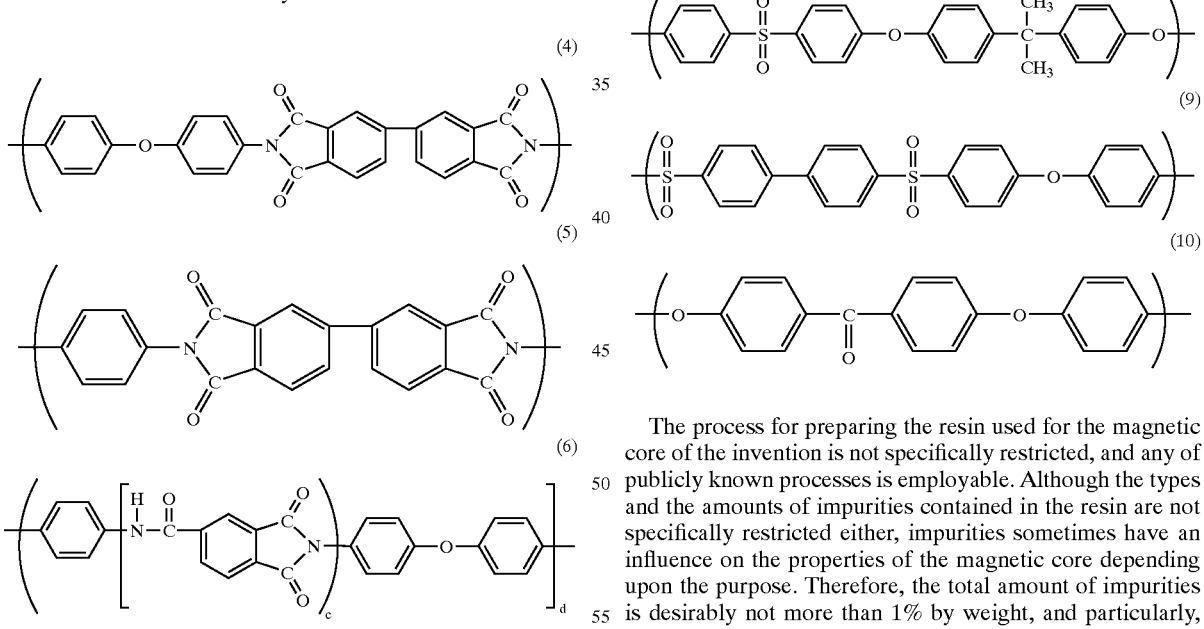

In the formula (6), c and d are numbers satisfying the conditions of c+d=1, $0 \leq c \leq 1$ and $0 \leq d \leq 1$.

The process for preparing the resin used for the magnetic core of the invention is not specifically restricted, and any of publicly known processes is employable. Although the types and the amounts of impurities contained in the resin are not specifically restricted either, impurities sometimes have an influence on the properties of the magnetic core depending upon the purpose. Therefore, the total amount of impurities is desirably not more than 1% by weight, and particularly, the total amount of ionic impurities such as sodium and chlorine is desirably not more than 0.5% by weight.

The polyimide resins having recurring units represented by the chemical formulas (1) and (2) in their main chain skeletons can be prepared by a generally known process using one or more aromatic tetracarboxylic dianhydrides selected from pyromellitic dianhydride, 3,3',4,4'-biphenyltetracarboxylic dianhydride, bis(3,4-dicarboxyphenyl)ether dianhydride and bis(3,4-dicarboxylphenyl)sulfone dianhydride and one or more aromatic diamines selected from 4,4'-bis(3-aminophenoxy)biphenyl, bis(4-(3-aminophenoxy)phenyl)sulfide, bis(4-(3- aminophenoxy)phenyl)sulfone, bis(4-(3-aminophenoxy) phenyl)ether, 1,3-bis(3-aminophenyl)benzene, 1,4-bis(3-aminophenyl)benzene and 1,3-bis(4-aminophenyl)benzene.

The polyether imide resins having recurring units represented by the chemical formula (3) in their main chain skeletons, the polyimide resins having recurring units represented by the chemical formulas (4) and (5) in their main chain skeletons, the polyamide-imide resins having recurring units represented by the chemical formula (6) in their main chain skeletons, the polysulfone resins having recurring units represented by the chemical formulas (7) to (9) in their main chain skeletons and the polyether ketone resins having recurring units represented by the chemical formula (10) in their main chain skeletons can be all prepared by processes publicly known. These resins are industrially manufactured. Examples of the polyether imide resins having recurring units represented by the chemical formula (3) in their main chain skeletons include ULTEM (trade name, available from GE PLASTICS JAPAN LTD.); examples of the polyimide resins having recurring units represented by the chemical formulas (4) and (5) in their main chain skeletons include Upilex (trade name, available from Ube Industries, Ltd.); examples of the polyamide-imide resins having recurring units represented by the formula chemical (6) in their main chain skeletons include TORLON (trade name, available from Teijin Amoco); examples of the polysulfone resins having recurring units represented by the chemical formulas (7) to (9) in their main chain skeletons include UDEL (trade name, available from Teijin Amoco) and RADEL (trade name, available from Teijin Amoco); and examples of the polyether ketone resins having recurring units represented by the chemical formula (10) in their main chain skeletons include Victrex (trade name, available from Victrex-MC). These resins are all commercially available, and brands suitable for the present invention are selected.

Examples of the processes for preparing the resins having recurring units represented by the chemical formulas (1) to (10) in their main chain skeletons are described in *New Polymer Experiment* 3, *Synthesis/Reaction of Polymers* (2), *Synthesis of Condensation Polymers,* edited by The Society of Polymer Science, Japan, published by KYORITSU SHUPPAN CO.,LTD.

The molecular weight and the molecular weight distribution of the resin used for the magnetic core of the invention are not specifically restricted, but if the molecular weight is extremely small or extremely large, an influence may be exerted on the strength of the coating film. Therefore, the logarithmic viscosity of a solution obtained by dissolving the resin in a solvent in a concentration of 0.5 g/100 ml, as measured at 35° C., is in the range of preferably 0.2 to 2.0 dl/g, particularly preferably 0.3 to 1.5 dl/g.

The repetition of constituent units in the resin used for the magnetic core of the invention is not specifically restricted, and any of alternate structure, random structure and block structure is available. Although the molecular shape usually used is linear, it may be branched. Further, the resin may be a graft-modified resin.

In the present invention, the thickness of the coated material on the core material is not less than 10 $\mu$m. If the thickness of the coated material is less than 10 $\mu$m, insulation between the magnetic core and a conductor wire wound around the magnetic core is liable to become insufficient, and there is a possibility of insufficient shape retention of the magnetic core. Consequently, the magnetic core cannot fulfill its function satisfactorily in some cases. The thickness of the coated material composed of the composition is preferably not less than 20 $\mu$m, more preferably not less than 30 $\mu$m.

The thickness 10 $\mu$m of the coated material defined in the present invention is a minimum coating thickness on the effective coated surface. That is to say, the magnetic core of the invention comprises the core material made of a laminate of an amorphous alloy ribbon and a coated material formed on the outer surface of the core material, and when the magnetic core is used by winding a conductor wire around it, the coated material formed on the outer surface of the core material needs to not only bind the core material that is a laminate but also secure insulation between the core material and the conductor wire. In order to effectively bind the core material made of a laminate of an amorphous alloy ribbon and to secure insulation between the core material and the conductor wire wound around the magnetic core, it is necessary to arrange the coated material on the place where insulation should be secured, and the thickness of the coated material on such a place needs to be not less than 10 $\mu$m.

In the magnetic core of the invention, the outer surface is coated with the composition containing the resin in a thickness of not less than 10 $\mu$m. Therefore, the magnetic core has excellent insulating properties from the conductor wire wound around the magnetic core and excellent shape retention properties, which cannot be attained by a magnetic core produced by a varnish of the prior technique. When a varnish of the prior technique is used, it is substantially difficult to coat the outer surface with a resin or the like in a thickness of not less than 10 $\mu$m that is necessary to exhibit insulating properties and shape retention properties. That is to say, because the conventional varnish is obtained by dissolving a resin component in an organic solvent and has a low viscosity, it becomes impossible to secure a sufficient thickness. Further, because the varnish contains a large amount of an organic solvent, it penetrates between the laminated amorphous alloy ribbons to lower the core loss properties. In contrast therewith, by the use of the resin in a powder form in the invention, a coated material having a sufficient thickness can be formed, and besides, penetration of the resin particles between the laminated amorphous alloy ribbons can be prevented.

In the present invention, the thickness of the coated film of the composition can be determined by a method of peeling the coated material and measuring its thickness or a method of cutting the magnetic core in the vertical direction to the coated material and observing its section. The latter method is preferably employed. The thickness of the coated material at the corner of the magnetic core is important, and the section is observed to measure the thickness of the coated material using a microscope or the like.

In the magnetic core of the invention, a part or the whole of laminated side surfaces of the amorphous alloy ribbon is adhesion-coated with the composition containing the resin having specific properties.

In the magnetic core of the invention, an area of not more than 10%, preferably not more than 8%, of the whole surface area of the amorphous alloy ribbon for forming the core material is coated with the resin-containing coated material. In the present invention, the lower limit of the coated area is not specifically restricted provided that the effects of the invention are not impaired.

Figure 6:
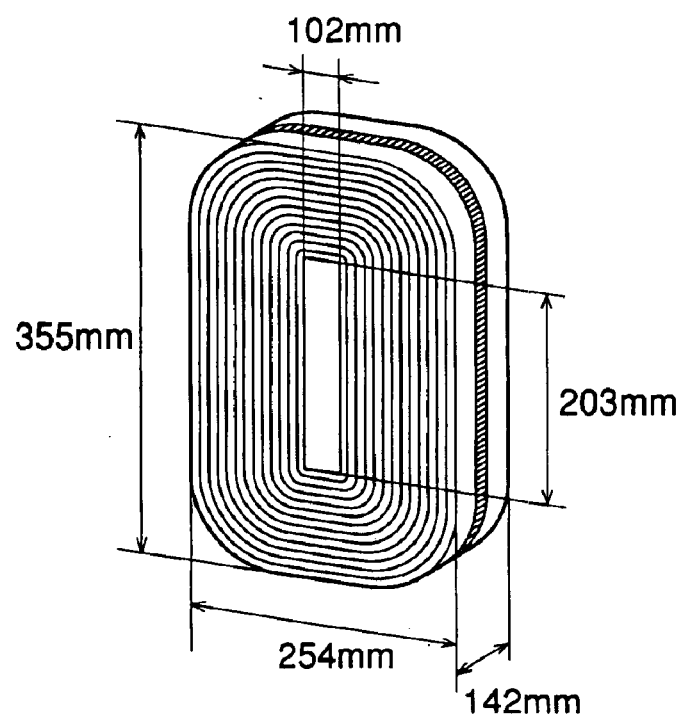
FIG. 6 is a view showing an example of a core material obtained by rolling amorphous alloy ribbons.

In the present invention, the laminated side surface of the amorphous alloy ribbon means a surface of a laminate in the thickness direction of the amorphous alloy ribbon, said laminate being formed by laminating the amorphous alloy ribbon, and is for example a surface shown in FIG. 6. The adhesion coating is carried out on a part or the whole of the laminated side surfaces, and the proportion of the coated area is not restricted provided that the effect of the invention, i.e., shape retention of the magnetic core, can be exerted. In case of an amorphous ribbon core (core material) of a large-sized and heavy magnetic core, the proportion of the adhesion-coated area tends to be preferably high from the viewpoint of shape retention properties. Taking inhibition of damages of the amorphous alloy ribbon due to external impact into consideration, the whole of the laminated side surfaces is preferably adhesion-coated. In the present invention, further, outer surfaces other than the laminated side surfaces may be adhesion-coated. However, there is a fear that the adhesion coating simultaneously gives unnecessary stress to the amorphous alloy ribbon to cause lowering of the core loss properties, so that it is disadvantageous to adhesion-coat the laminated side surfaces and other outer surfaces more than needed. If they are adhesion-coated more than needed, there is a fear that the effects of the invention are not obtained.

The adhesive resin composition for a magnetic core, which is used for forming the coated material of the magnetic core of the invention, contains particles of a resin, and the resin has both of the following two properties.

(1) The resin has a tensile strength, as measured at 30° C. after annealing of 365° C. and 2 hours in a nitrogen atmosphere, of not less than 30 MPa and has a loss in weight, due to thermal decomposition after annealing of 365° C. and 2 hours in a nitrogen atmosphere, of not more than 2% by weight.

(2) The resin is a thermoplastic resin and has a melt viscosity at 365° C. of 20 to 50000 Pa·s.

The resin used for the adhesive resin composition of the invention is a resin having properties that the tensile strength as measured at 30° C. after annealing of 365° C. and 2 hours in a nitrogen atmosphere is not less than 30 MPa and the loss in weight due to thermal decomposition after annealing of 365° C. and 2 hours in a nitrogen atmosphere is not more than 2% by weight. If the tensile strength as measured at 30° C. after annealing of 365° C. and 2 hours in a nitrogen atmosphere is less than 30 MPa, the coating properties become insufficient to cause a problem of insulating properties. Moreover, there is a possibility of a problem of shape retention of the magnetic core. If the loss in weight due to thermal decomposition after annealing of 365° C. and 2 hours in a nitrogen atmosphere exceeds 2% by weight, insulating properties and shape retention are lowered similarly to the above. Moreover, there is a fear that volatile components or carbon-containing substances produced by decomposition are liable to stain an oven used for the annealing heat treatment. The upper limit of the tensile strength as measured at 30° C. after annealing of 365° C. and 2 hours in a nitrogen atmosphere is not specifically restricted, but if the tensile strength is too high, there is a possibility of cracking of the coating film. Therefore, the tensile strength is preferably not more than 300 MPa, more preferably not more than 250 MPa. The tensile strength and the weight in loss can be measured by the same methods as previously described.

The resin used for the adhesive resin composition of the invention is a thermoplastic resin and has a melt viscosity at 365° C. of 20 to 50000 Pa·s. If the melt viscosity at 365° C. is less than 20 Pa·s, the minimum thickness 10 $\mu$m of the coating film formed on the outer surface of the core material cannot be secured in some cases, and hence, there is a fear that the effects of the invention are not obtained. If the melt viscosity at 365° C. exceeds 50000 Pa·s, it becomes difficult to form a uniform coating film, and the coating film is liable to peel off from the magnetic core. Hence, there is a fear that the effects of the invention are not obtained.

In the present invention, measurement of the melt viscosity is carried out by the use of an extrusion type capillary rheometer generally used. For example, a Koka-type flow tester is preferably used. After the resin is kept at 365° C. for 5 minutes, it is extruded at a pressure of 100000 hPa by the use of an orifice having a diameter of 0.1 cm and a length of 1 cm to measure the melt viscosity.

In addition to the above properties, the resin for use in the invention preferably further has the following properties.

(3) When the temperature of the resin is lowered to 120° C. from 400° C. at a constant rate of 0.5° C./min, the heat of fusion of crystal portions present in the resin is not more than 10 J/g. If the heat of fusion exceeds 10 J/g, the resin has high crystallizability, and owing to the phase change of the resin caused by crystallization, unnecessary stress is applied to the core material made of a laminate of an amorphous alloy ribbon, whereby the core loss properties are liable to be lowered. In addition, there is a possibility that the shrinkage due to phase change of the resin lowers adhesion between the resin and the amorphous alloy ribbon to thereby give an evil influence on the shape retention properties.

In the present invention, the heat of fusion of the crystal portions can be measured by differential scanning calorimetry (DSC method). More specifically, a resin sample is heated at a rate of 10° C./min and then cooled to 120° C. from 400° C. at a constant rate of 0.5° C./min, and the resin sample is set in a usual DSC (differential scanning calorimeter) and heated at a rate of 10° C./min in a nitrogen atmosphere. Then, a peak that appears at the melting temperature is analyzed to determine the heat of fusion.

(4) The amount of an organic solvent remaining in the resin is not more than 1% by weight. If the amount of the organic solvent remaining in the resin exceeds 1% by weight, bubbles attributable to evaporation of the organic solvent during the temperature rise or the annealing heat treatment are liable to be produced, and unnecessary stress is applied to the core material made of a laminate of the amorphous alloy ribbon to thereby sometimes lower the core loss properties.

In the present invention, measurement of the amount of the organic solvent remaining in the resin is carried out by FID gas chromatography. A resin sample is heated at 400° C. in a heater built in a gas chromatograph to separate the organic solvent, and the organic solvent is quantitatively determined using calibration curves of various organic solvents prepared in advance.

Examples of the resins preferably used in the adhesive resin composition of the invention include a polyimide resin, a polyether imide resin, a polyamide-imide resin, a polyamide resin, a polysulfone resin and a polyether ketone resin. One resin selected from these resins may be used, or two or more resins selected from these resins may be used in combination.

More specifically, thermoplastic resins having, in their main chain skeletons, recurring units represented by the following chemical formulas (1) to (10) can be preferably employed as the resins for the adhesive resin composition of the invention. One resin selected from these resins may be used, or two or more resins selected from these resins may

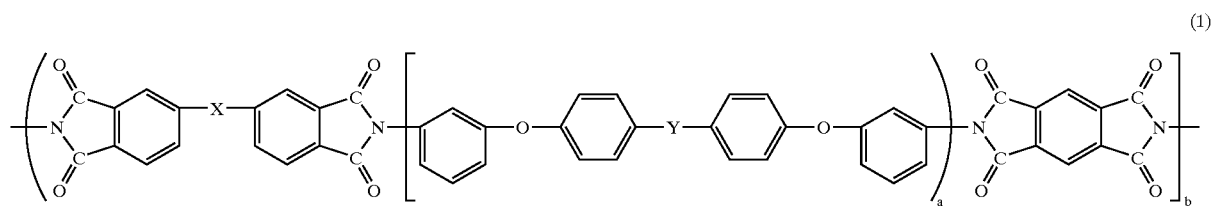

In the chemical formula (1), a and b are numbers satisfying the conditions of a+b=1, $0 \leq a \leq 1$ and $0 \leq b \leq 1$, and X and Y are each independently a bond group selected from a direct bond, an ether bond, an isopropylidene bond, a sulfide bond, a sulfone bond and a carbonyl bond and may be the same or different.

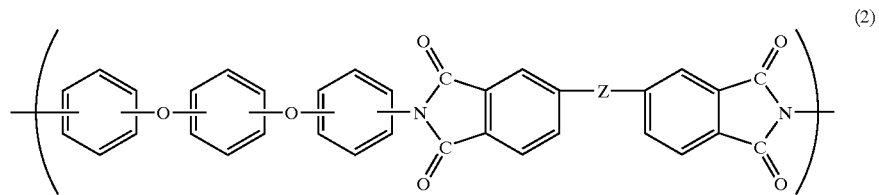

In the chemical formula (2), Z is a bond group selected from a direct bond, an ether bond, an isopropylidene bond, a sulfide bond, a sulfone bond and a carbonyl bond.

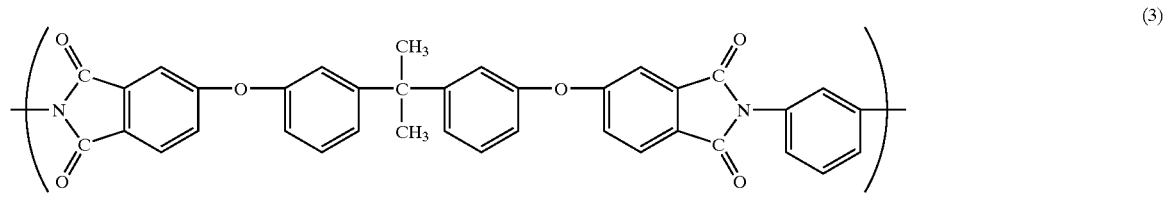

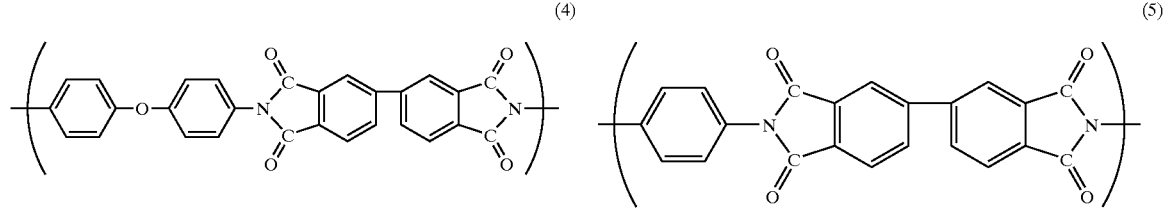

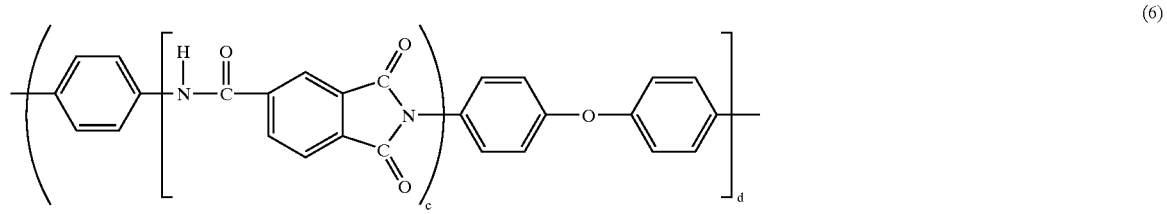

In the chemical formula (6), c and d are numbers satisfying the conditions of c+d=1, 0≦c≦1 and 0≦d≦1.

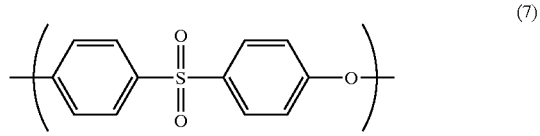
(7)

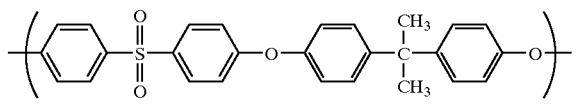
(8)

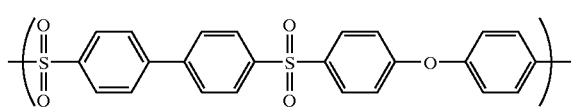
(9)

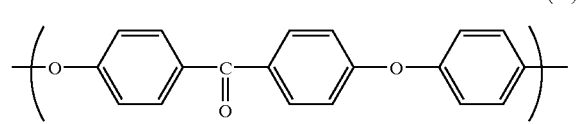
(10)

The process for preparing the resin used for the adhesive resin composition of the invention is not specifically restricted, and any of publicly known processes is employable. Although the types and the amounts of impurities contained in the resin are not specifically restricted either, impurities sometimes have an influence on the properties of the magnetic core depending upon the purpose. Therefore, the total amount of impurities is desirably not more than 1% by weight, and particularly, the total amount of ionic impurities such as sodium and chlorine is desirably not more than 0.5% by weight.

The polyimide resins having recurring units represented by the chemical formulas (1) and (2) in their main chain skeletons can be prepared by a generally known process using on the orpose aromatic tetracarboxylic dianhydrides selected from pyromellitic dianhydride, 3,3',4,4'-biphenyltetracarboxylic dianhydride, bis(3,4-dicarboxyphenyl)ether dianhydride and bis(3,4-dicarboxylphenyl)sulfone dianhydride and one or more aromatic diamines selected from 4,4'-bis(3-aminophenoxy)biphenyl, bis(4-(3-aminophenoxy)phenyl)sulfide, bis(4-(3-aminophenoxy)phenyl)sulfone, bis(4-(3-aminophenoxy)phenyl)ether, 1,3-bis(3-aminophenyl)benzene, 1,4-bis(3-aminophenyl)benzene and 1,3-bis(4-aminophenyl)benzene. The polyether imide resins having recurring units represented by the chemical formula (3) in their main chain skeletons, the polyimide resins having recurring units represented by the chemical formulas (4) and (5) in their main chain skeletons, the polyamide-imide resins having recurring units represented by the chemical formula (6) in their main chain skeletons, the polysulfone resins having recurring units represented by the chemical formulas (7) to (9) in their main chain skeletons and the polyether ketone resins having recurring units represented by the chemical formula (10) in their main chain skeletons can be all prepared by processes publicly known. These resins are industrially manufactured. Examples of the polyether imide resins having recurring units represented by the chemical formula (3) in their main chain skeletons include ULTEM (trade name, available from GE PLASTICS JAPAN LTD.); examples of the polyimide resins having recurring units represented by the chemical formulas (4) and (5) in their main chain skeletons include Upilex (trade name, available from Ube Industries, Ltd.); examples of the polyamide-imide resins having recurring units represented by the formula chemical (6) in their main chain skeletons include TORLON (trade name, available from Teijin Amoco); examples of the polysulfone resins having recurring units represented by the chemical formulas (7) to (9) in their main chain skeletons include UDEL (trade name, available from Teijin Amoco) and RADEL (trade name, available from Teijin Amoco); and examples of the polyether ketone resins having recurring units represented by the chemical formula (10) in their main chain skeletons include Victrex (trade name, available from Victrex-MC). These resins are all commercially available, and brands suitable for the present invention are selected. Examples of the processes for preparing the resins having recurring units represented by the chemical formulas (1) to (10) in their main chain skeletons are described in *New Polymer Experiment 3, Synthesis/Reaction of Polymers* (2), *Synthesis of Condensation Polymers*, edited by The Society of Polymer Science, Japan, published by KYORITSU SHUPPAN CO.,LTD.

The molecular weight and the molecular weight distribution of the resin used for the adhesive resin composition of the invention are not specifically. restricted, but the resin needs to have a molecular weight and a molecular weight distribution satisfying a melt viscosity at 365° C. of 20 to 50000 Pa·s. If the molecular weight is extremely small, an influence may be exerted on the strength of the coating film. Therefore, the logarithmic viscosity of a solution obtained by dissolving the resin in a solvent in a concentration of 0.5 g/100 ml, as measured at 35° C., is preferably not less than 0.2 dl/g, more preferably not less than 0.3 dl/g. If the molecular weight is extremely large, flowability of the resin in the annealing heat treatment is decreased, and thereby an appropriate resin film cannot be formed in some cases. Therefore, the logarithmic viscosity of a solution obtained by dissolving the resin in a solvent in a concentration of 0.5 g/100 ml, as measured at 35° C., is preferably not more than 2.0 dl/g, more preferably not more than 1.5 dl/g.

Although the amount of an organic solvent remaining in the resin used for the adhesive resin composition of the invention is not specifically restricted, it is preferably not more than 1% by weight. If the amount of the organic solvent remaining in the resin exceeds 1% by weight, bubbles attributable to evaporation of the organic solvent during the temperature rise or the annealing heat treatment are produced, and the bubbles are liable to exert an influence on the insulating properties of the coating film. Measurement of the amount of the organic solvent remaining in the resin is carried out by FID gas chromatography. A resin sample is heated at 400° C. in a heater built in a gas chromatograph to separate the organic solvent, and the organic solvent is quantitatively determined using calibration curves of various organic solvents prepared in advance.

The repetition of constituent units in the resin used for the adhesive resin composition of the invention is not specifically restricted, and any of alternate structure, random structure and block structure is available. Although the molecular shape usually used is linear, it may be branched. Further, the resin may be a graft-modified resin.

The suitable state of the adhesive resin composition of the invention varies depending upon its purpose or workability. For example, if electrostatic powder coating is adopted, a powder composition containing particles of the resin is preferable. If spraying, brushing or dipping is adopted, a liquid or paste composition containing particles of the resin and a liquid incapable of dissolving the resin can be preferably employed. In the adhesive resin composition of the invention, components other than the particles of the resin and the liquid incapable of dissolving the resin may be contained within limits not detrimental to the effects of the invention. Such components are not specifically restricted, and for example, inorganic fillers, other resins and liquids may be contained. The adhesive resin composition of the invention may consist of only the particles of the resin and the liquid incapable of dissolving the resin.

With regard to the properties (e.g., size) of the particles of the resin in the adhesive resin composition of the invention, the optimum conditions vary depending upon the purpose or the workability of the adhesive resin composition, and the conditions suitable for the purpose or the workability are preferably employed. In case of, for example, electrostatic powder coating, it is preferable that the volume-based average particle diameter is in the range of 5 to 200 $\mu$m and the surface area per unit weight is in the range of 0.02 to 1 m$^2$/g, from the viewpoint of uniform coating of the adhesive resin composition of the invention. In case of spraying, brushing or dipping of the above liquid or paste composition, it is preferable that the volume-based average particle diameter is in the range of 0.5 to 100 $\mu$m and the surface area per unit weight is in the range of 0.04 to 10 m$^2$/g, and it is more preferable that the volume-based average particle diameter is in the range of 2 to 50 $\mu$m and the surface area per unit weight is in the range of 0.05 to 4 m$^2$/g. When the particle diameter and the surface area are in the above ranges, the adhesive resin composition of the invention can have properties (e.g., viscosity) suitable for workability and the like. The above values, however, are only examples of preferred conditions, and the particle diameter and the surface area vary depending upon other components contained in the adhesive resin composition of the invention, composition ratio, etc., so that they are not limited to the above ranges.

The adhesive resin composition for a magnetic core according to the invention preferably contains particles of a resin and particles of an inorganic substance, and the particles of a resin and the particles of an inorganic substance preferably satisfy the following mathematical formula (A):

$$0.05 \leq [(Sp \cdot Cp)/(Sf \cdot Cf)] \leq 50 \quad \text{(A)}$$

wherein Sp and Sf are a surface area of the particles of a resin and a surface area of the particles of an inorganic substance based on unit weight, respectively, and Cp and Cf are a content of the particles of a resin and a content of the particles of an inorganic substance in the composition, respectively.

The unit of each of Sp and Sf is m$^2$/g, and the unit of each of Cp and Cf is % by weight.

The inorganic substance used herein is preferably a substance having a melting point or a softening point of not lower than 450° C.

The adhesive resin composition for a magnetic core preferably contains a liquid incapable of dissolving the resin and the inorganic substance, and the liquid is preferably one or more aqueous media selected from water, methanol and ethanol.

The adhesive resin composition for a magnetic core according to the invention may be a powder coating composition containing no liquid.

In the adhesive resin composition of the invention, the content of the particles of the resin is not specifically restricted, but it is preferably not less than 1% by weight, more preferably 20% by weight.

For applying the adhesive resin composition of the invention, a method of electrostatic powder coating using a powder, a method of applying a liquid or a paste containing a liquid incapable of dissolving the resin by the use of a brush or a trowel, a spraying method or a dipping method is preferably adopted. From the viewpoint of uniform and rapid coating, electrostatic powder coating, spraying or dipping is more preferably adopted. In case of the electrostatic powder coating, adjusting agents may be added to make the best use of the method. In case of the spraying or the dipping, it is preferable to adjust the properties such as viscosity so as to be suitable for the spraying method or the like. For example, the properties such as viscosity can be adjusted by controlling the particle diameter, content, etc. of the resin powder. The spraying method can be carried out by the use of a commercially available spray gun and a compressed gas such as compressed air. By adjusting the viscosity of the resin composition to be sprayed, coating can be carried out without sagging on the coating surface and the coating thickness can be arbitrarily determined. Although some examples of the coating methods are given above, the coating method employable in the invention is not limited thereto.

When the adhesive resin composition of the invention contains particles of a resin and a liquid incapable of dissolving the resin, the liquid incapable of dissolving the resin is preferably an aqueous medium, such as water, methanol or ethanol, and is more preferably water. Although the types and the amounts of impurities contained in the water are not specifically restricted, impurities may cause a problem of corrosion of the magnetic core depending upon the purpose. Therefore, the total amount of impurities is desirably not more than 1% by weight, and particularly, the total amount of ionic impurities such as sodium and chlorine is desirably not more than 0.5% by weight.

The process for producing the adhesive resin composition for a magnetic core is not specifically restricted, and any of processes publicly known is employable. The particles of the resin can be obtained by, for example, freeze-pulverizing pellets of the resin by an impact pulverizer or adding a solvent incapable of dissolving the resin to a solution of the resin by portions to precipitate particles of the resin. For incorporating particles of the resin and the liquid incapable of dissolving the resin, particles of the resin may be first prepared and then mixed with the liquid, or the resin may be mixed with the liquid and then subjected to an appropriate pulverizing method to give desired particles. An example of the latter process is a process wherein a resin powder of particles of about several hundreds $\mu$m obtained by coarsely pulverizing a resin is mixed with water and then pulverized by the use of a wet jet mill (e.g., Sugino Machine Ulthimaizer System). Although the mixing method is not specifically restricted, it is preferable to use a method capable of mixing the resin powder with the liquid homogeneously.

The adhesive resin composition for a magnetic core according to the invention is an adhesive resin composition which contains particles of a resin having specific properties, or an adhesive resin composition which contains particles of a resin having specific properties and a liquid incapable of dissolving the resin, preferably water. Differently from a case of using an organic solvent which is capable of dissolving a resin and liable to exert an evil influence on safety and workability, any special measures regarding handling or diffusion into the atmosphere do not need to be taken. Also in the temperature rise of the annealing heat treatment, any special care is unnecessary, and foaming which is liable to occur by the use of a varnish does not occur. Further, because the components contained in the composition are resin particles chemically stable or resin particles chemically stable and a liquid incapable of dissolving them, the composition is remarkably chemically stable at temperatures near ordinary temperature and is not deteriorated with time differently from a varnish. Therefore, any special measures, such as refrigeration, do not need to be taken when the composition is stored. Moreover, by the use of the adhesive resin composition of the invention, a coating film having insulating properties and shape retention properties can be formed on the outer surface of the magnetic core. Such characteristics of the composition are greatly different from those of a varnish of prior technique by which a coating film having insulating properties and shape retention properties cannot be substantially formed on the outer surface of the magnetic core. Formation of such an excellent coating film can be achieved only when the adhesive resin composition of the invention is used. By the use of the adhesive resin composition of the invention, problems that could not be solved by a varnish of prior technique can be solved, and a magnetic core having insulting properties and shape retention properties can be efficiently produced without using an organic solvent. Moreover, the adhesive resin composition of the invention per se is stable to heat and elapse of time.

For producing a magnetic core using the adhesive resin composition of the invention, there can be preferably employed a process comprising providing the adhesive resin composition of the invention to a core material having been not subjected to annealing heat treatment, and then performing annealing heat treatment to allow the resulting magnetic core to exhibit specific magnetic properties, wherein the adhesion coating of the core material with the adhesive resin composition of the invention and the annealing heat treatment are carried out in the same step. In this process, formation of the coating film and the annealing heat treatment can be carried out at the same time. Therefore, any additional step or apparatus is not necessary at all, and a complicated operation such as handling of a brittle amorphous alloy ribbon after the annealing heat treatment becomes unnecessary.

In the present invention, the place to be coated with the adhesive resin composition of the invention is not specifically restricted provided that the effects of the invention can be obtained, but the place is preferably at least a corner of the core material, more preferably the whole outer surface of the core material.

The magnetic core according to the invention is a magnetic core which is imparted with insulating properties and shape retention properties after the annealing heat treatment without handling a brittle ribbon, and this magnetic core could not be accomplished by the conventional process coating a thermosetting resin or using a varnish. The adhesive resin composition of the invention is useful for efficiently producing such an excellent magnetic core without using an organic solvent, and besides the composition is stable to heat and elapse of time.

EXAMPLE

The present invention is further described with reference to the following examples. In the examples, various properties were measured by the following methods.
(1) Logarithmic Viscosity [η]
Resin: A resin is dissolved in a solvent capable of dissolving the resin (e.g., chloroform, 1-methyl-2-pyrrolidone, dimethylformamide, o-dichlorobenzene, cresol) in a concentration of 0.5 g/100 ml, followed by measuring logarithmic viscosity at 35° C.
Varnish: A varnish was diluted with the same solvent as used in the varnish in such a manner that a concentration of a resin component in the varnish would become 0.5 g/100 ml, followed by measuring logarithmic viscosity at 35° C.
(2) Glass Transition Temperature
The glass transition temperature was measured by a DSC method (Shimadzu DSC-60) under the conditions of a heating rate of 10° C./min.

(3) Tensile Strength at 30° C. After Annealing of 365° C. and 2 Hours in Nitrogen Atmosphere
The tensile strength was measured in accordance with JIS K 7127. A film having a thickness of about 100 to 300 μm was formed by hot pressing or casting, and the film was heated up to 365° C. from room temperature at a rate of 10° C./min in a nitrogen atmosphere and then subjected to heat history of 365° C. and 2 hours. From the film, a test specimen of No. 3 was punched, and the specimen was used for the measurement.
(4) Loss in Weight Due to Thermal Decomposition After Annealing of 365° C. and 2 Hours in Nitrogen Atmosphere
A sample was dried at 200° C. for 2 hours in a stream of nitrogen, then set in a thermogravimeter (Shimadzu TGA-50) and heated at a rate of 10° C./min in a nitrogen atmosphere. When a temperature of 365° C. was reached, this temperature was maintained for 2 hours. The weight in loss due to thermal decomposition was determined as a ratio of a weight of the sample decreased during the period of 2 hours at 365° C. to a weight of the sample measured when a temperature of 365° C. was reached.
(5) Melt Viscosity at 365° C.
The melt viscosity was measured by a Koka-type flow tester (Shimadzu CFT-500) using an orifice having a diameter of 0.1 cm and a length of 1 cm. The resin was kept at 365° C. for 5 minutes and extruded at a pressure of 100000 hPa.
(6) Volume-based Average Particle Diameter
The volume-based average particle diameter was measured by a particle diameter measuring device (Nikkiso Microtrack 9320-X100).
(7) Thickness of Coating Film
The magnetic core was cut in the vertical direction to the coating film, and the section of the magnetic core was observed by a light microscope to determine a thickness of the coating film.
(8) Proportion of Area of the Surface Coated with the Composition to the Whole Surface of Amorphous Alloy Ribbon
Laminated ribbons constituting the magnetic core were separated from each other. Then, the surfaces of the amorphous alloy ribbons were visually observed, and the coated portion produced by penetration of the composition was judged and calculated. 1% by weight of the outer peripheral portion, 1% by weight of the inner peripheral portion and 1% by weight of the intermediate portion between them, based on the whole weight of the magnetic core, were analyzed, and an average value was calculated.
(9) Core Loss
The core loss was measured by a B-H analyzer (IWATSU SY-8216) under the conditions of a frequency of 60 Hz and a maximum magnetic flux density of 1.3 tesla. A core loss of a magnetic core obtained by the same process including heat treatment except that the composition or the like was not applied was taken as a blank value, and the proportion of an increased core loss to the blank value was taken as a core loss increase ratio.

Synthesis Example 1

As shown in Table 1, resins P1 to P13 having recurring units represented by the chemical formulas (11) to (21) in their main chain skeletons and having logarithmic viscosities described in Table 1 were prepared by synthesis or the like. Properties (glass transition temperature, tensile strength at 30° C. after annealing of 365° C. and 2 hours in nitrogen atmosphere, loss in weight due to thermal decomposition after annealing of 365° C. and 2 hours in nitrogen atmosphere, melt viscosity at 365° C.) of the resins were measured. The results are set forth in Table 1.

TABLE 1
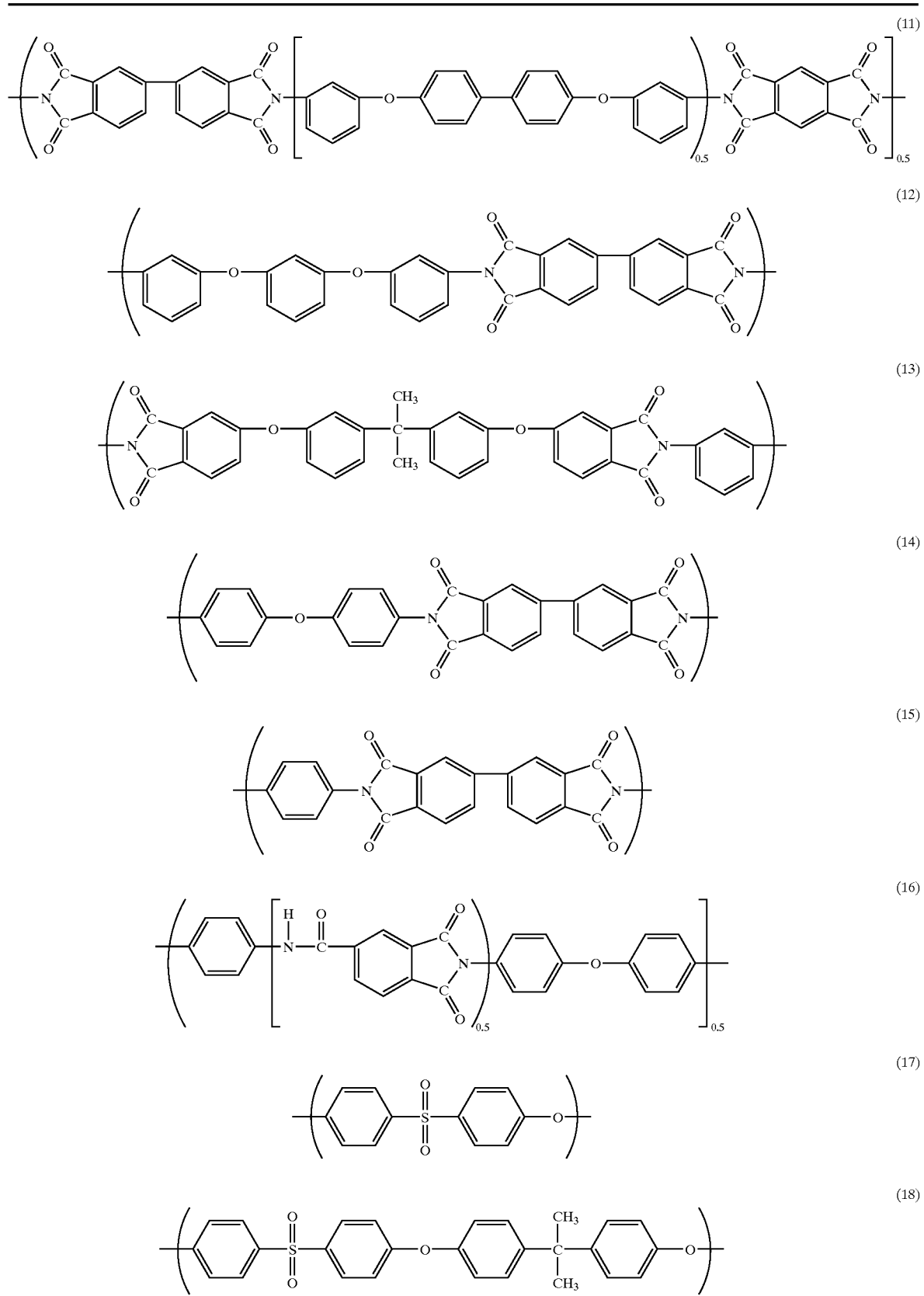

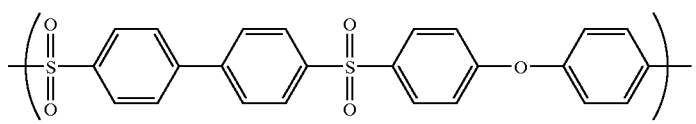
(19)

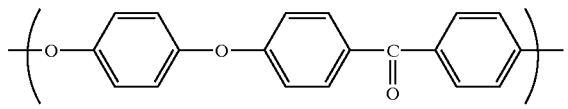
(20)

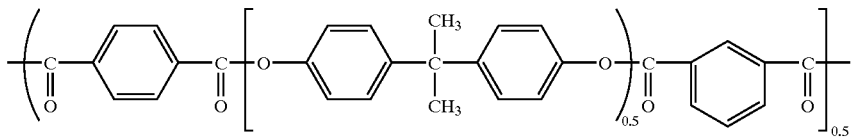
(21)

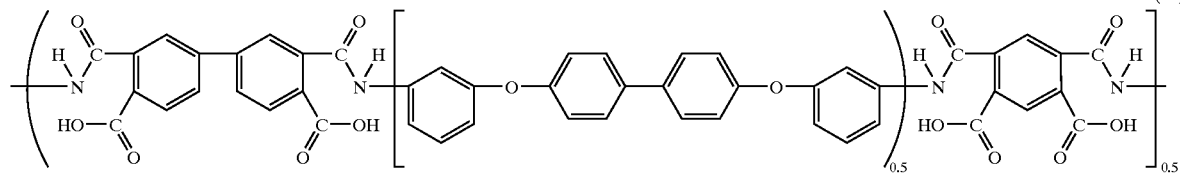
(22)

| Resin No. | Structure | Logarithmic viscosity [η] (dl/g) | Glass transition temperature Tg (° C.) | Tensile Strength (MPa) | Loss in weight (wt %) | Melt viscosity (Pa·s) |
|---|---|---|---|---|---|---|
| P1 | chemical formula (11) | 0.45 | 235 | 97 | 0.34 | 1450 |
| P2 | chemical formula (12) | 0.81 | 196 | 90 | 0.26 | 90 |
| P3 | chemical formula (13) | 0.59 | 217 | 102 | 0.26 | 1500 |
| P4 | chemical formula (14) | 0.44 | 285 | 110 | 0.19 | 3300 |
| P5 | chemical formula (15) | 0.31 | 358 | 111 | 0.15 | 5500 |
| P6 | chemical formula (16) | 0.45 | 260 | 140 | 1.21 | 2550 |
| P7 | chemical formula (17) | 0.49 | 225 | 72 | 0.15 | 650 |
| P8 | chemical formula (18) | 0.57 | 190 | 55 | 0.31 | 980 |
| P9 | chemical formula (19) | 0.45 | 285 | 76 | 0.14 | 820 |
| P10 | chemical formula (20) | 0.45 | 143 | 95 | 0.02 | 1420 |
| P11 | chemical formula (21) | 0.75 | 193 | 20 | 3.8 | 520 |
| P12 | chemical formula (12) | 0.51 | 194 | 88 | 0.27 | 4.5 |
| P13 | chemical formula (11) | 1.35 | 236 | 100 | 0.29 | 55000 |

Then, using the resins P1 to P13, compositions C1 to C14 were prepared as shown in Table 2. For pulverizing the resins, a freeze pulverization method using an impact pulverizer and/or a method using a wet jet mill (Sugino Machine Ulthimaizer System) was used. The volume-based average particle diameter of the resin particles, ratio between the resin particles and water in the compositions, and properties of the compositions are set forth in Table 2.

TABLE 2

| Composition No. | Resin No. | Resin Average particle diameter (μm) | Compounding ratio Particles of resin (part(s) by weight) | Water (part(s) by weight) | Property of composition |
|---|---|---|---|---|---|
| C1 | P1 | 42 | 100 | 0 | powder |
| C2 | P1 | 8.2 | 100 | 180 | paste |
| C3 | P2 | 38 | 100 | 0 | powder |
| C4 | P3 | 39 | 100 | 0 | powder |
| C5 | P4 | 40 | 100 | 0 | powder |
| C6 | P5 | 34 | 100 | 0 | powder |
| C7 | P6 | 52 | 100 | 0 | powder |
| C8 | P7 | 41 | 100 | 0 | powder |
| C9 | P8 | 39 | 100 | 0 | powder |
| C10 | P9 | 40 | 100 | 0 | powder |
| C11 | P10 | 34 | 100 | 0 | powder |
| C12 | P11 | 52 | 100 | 0 | powder |
| C13 | P12 | 41 | 100 | 0 | powder |
| C14 | P13 | 39 | 100 | 0 | powder |

Then, a polyamide acid varnish having a recurring unit represented by the chemical formula (22) in its main chain skeleton, which was synthesized by dissolving pyromellitic dianhydride, 3,3',4,4'-biphenyltetracarboxylic dianhydride and 4,4'-bis(3-aminophenoxy)biphenyl in N,N'-dimethylacetamide at ordinary temperature, and a U varnish available from Ube Industries, Ltd. were prepared as a varnish V1 and a varnish V2, respectively, as shown in Table 3. Further, a varnish V3 was prepared by storing the varnish V1 at 30° C. for 6 months.

TABLE 3

| Varnish No. | | η inh |
|---|---|---|
| V1 | amide acid varnish of chemical formula (22) | 0.44 |
| V2 | U varnish | 0.45 |
| V3 | varnish obtained by storing V1 at ordinary temperature for 6 months | |

Example 1

An amorphous alloy ribbon (width: 10 mm, thickness: 25 μm) having a composition ratio Fe:Si:B of 78:9:13 by atom was rolled to prepare a core material having a thickness of 10 mm, an inner diameter of 15 mm, an outer diameter of 25 mm and a weight of 19.5 g. The whole outer surface of the core material was coated with the composition C1 shown in Table 2 by a usual electrostatic powder coating method. Then, the core material was heated up to 400° C. from 30° C. at a constant rate over a period of 1 hour in a nitrogen atmosphere and held at 400° C. for 2 hours to perform annealing heat treatment, followed by allowing the core material to cool.

The resulting magnetic core had a uniform coating film on the whole outer surface, and even when a load of 500 g was applied, the magnetic core was not deformed at all. The magnetic core was cut, and the thickness of the coating film was observed. As a result, the thickness at the corner portion was 45 μm, and the thickness at portions other than the corner portion was 102 μm.

When a conductor wire of metallic copper was coiled around the magnetic core, no damage was observed on the conductor wire. Further, a value of resistance between the conductor wire and the magnetic core was measured by the use of a resistance value measuring device, and as a result, it was not less than 1000000Ω. Taking a resistance value 1.7 micro Ω·cm of copper and a resistance value 1.3 micro Ω·m of an amorphous alloy ribbon into consideration, the insulating properties proved to have no problem.

The B-H hysteresis loop was observed under the conditions of a frequency of 100 KHz and a magnetic flux density of 1.0 tesla. As a result, the shape of the loop was the same as that of a proper loop of the magnetic core, so that it has been confirmed that the insulating properties exerted no evil influence on the function of the magnetic core.

Example 2

Examination was made in the same manner as in Example 1, except that the resin composition was replaced with the composition C2 shown in Table 2 and the coating method was changed to a dipping method. The results are set forth in Table 4.

The shape retention of the magnetic core after the annealing heat treatment was good. Moreover, the thickness of the coating film, insulating properties and the shape of the B-H hysteresis loop were also good.

Examples 3 to 11

Examination was made in the same manner as in Example 1, except that the resin composition was replaced with each of the compositions C3 to C11 shown in Table 2. The results are set forth in Table 4.

The shape retention of the magnetic core after the annealing heat treatment was good. Moreover, the thickness of the coating film, insulating properties and the shape of the B-H histeresis loop were also good.

Comparative Example 1

Examination was made in the same manner as in Example 1, except that the resin composition was replaced with the composition C12 shown in Table 2. The results are set forth in Table 4.

The coating film after the annealing heat treatment had blisters, and the film was brittle and liable to peel off. By the application of a load, the magnetic core was easily deformed, and a part of the coating film peeled off. The thickness of the coating film was good, but when the conductor wire was coiled, the coating film peeled off at the place where the conductor wire was in contact with the corner of the magnetic core. And damages were observed on the conductor wire. The value of resistance was small and 0.21Ω, and the insulating properties proved to be not good. In addition, the B-H hysteresis loop was greatly distorted and its shape was different from a proper one.

Comparative Example 2

Examination was made in the same manner as in Example 1, except that the resin composition was replaced with the composition C13 shown in Table 2. The results are set forth in Table 4.

The coating film after the annealing heat treatment was relatively uniform and deformation of the magnetic core due to application of a load was not found. However, the thickness of coating film was thin, and during the heat treatment, a part of the resin sagged in the oven. The thickness of the coating film was not sufficient, and when the conductor wire was coiled, damages were found on the conductor wire at the place where the conductor wire was in contact with the corner of the magnetic core. The value of resistance was small and 0.11Ω, and the insulating properties proved to be not good. In addition, the B-H hysteresis loop was greatly distorted and its shape was different from a proper one.

Comparative Example 3

Examination was made in the same manner as in Example 1, except that the resin composition was replaced with the composition C14 shown in Table 2. The results are set forth in Table 4.

The coating film after the annealing heat treatment was relatively uniform though there was some unevenness. The coating film was liable to peel off, and the magnetic core was slightly deformed by the application of a load. In addition, a gap was partially produced between the coating film and the core material, and the shape retention properties proved to be insufficient.

Comparative Examples 4 to 6

Examination was made in the same manner as in Example 1, except that the resin composition was replaced with each of the varnishes V1 to V3 shown in Table 3 and the coating method was changed to a dipping method. The results are set forth in Table 4.

Although the magnetic core after the annealing heat treatment was very rigid and was not deformed by the application of a load, coating with the resin was hardly made. The thickness of the coating film was not sufficient, and when the conductor wire was coiled, damages were found on the conductor wire at the place where the conductor wire was in contact with the corner of the magnetic core. The value of resistance was small and not more than 0.1Ω, and the insulating properties proved to be not good. In addition, the B-H hysteresis loop was greatly distorted and its shape was different from a proper one.

TABLE 4

| | Coated material | Coating method | Shape retention of magnetic core | State of coating film | Thickness of coating film ($\mu$m) Corner | Other portions | Resistance ($\Omega$) | Shape of B-H Hysteresis loop |
|---|---|---|---|---|---|---|---|---|
| Ex. 1 | C1 | electrostatic powder coating | good not changed under load | uniform | 45 | 102 | not less than 1000000 | good |
| Ex. 2 | C2 | dipping | good not changed under load | uniform | 70 | 204 | not less than 1000000 | good |
| Ex. 3 | C3 | electrostatic powder coating | good not changed under load | uniform | 15 | 30 | not less than 1000000 | good |
| Ex. 4 | C4 | electrostatic powder coating | good not changed under load | uniform | 40 | 80 | not less than 1000000 | good |
| Ex. 5 | C5 | electrostatic powder coating | good not changed under load | uniform | 42 | 98 | not less than 1000000 | good |
| Ex. 6 | C6 | electrostatic powder coating | good not changed under load | uniform | 50 | 151 | not less than 1000000 | good |
| Ex. 7 | C7 | electrostatic powder coating | good not changed under load | uniform | 45 | 102 | not less than 1000000 | good |
| Ex. 8 | C8 | electrostatic powder coating | good not changed under load | uniform | 47 | 87 | not less than 1000000 | good |
| Ex. 9 | C9 | electrostatic powder coating | good not changed under load | uniform | 40 | 98 | not less than 1000000 | good |
| Ex. 10 | C10 | electrostatic powder coating | good not changed under load | uniform | 42 | 151 | not less than 1000000 | good |
| Ex. 11 | C11 | electrostatic powder coating | good not changed under load | uniform | 50 | 75 | not less than 1000000 | good |
| Comp. Ex. 1 | C12 | electrostatic powder coating | peeling of coating film under load/ easily deformed | blistered | 30 | 50 | 0.21 | bad |
| Comp. Ex. 2 | C13 | electrostatic powder coating | good not changed under load | relatively uniform | 8 | 25 | 0.11 | bad |
| Comp. Ex. 3 | C14 | electrostatic powder coating | peeling of coating film under load/ slightly deformed | slightly uneven | 94 | 158 | not less than 1000000 | good |

TABLE 4-continued

| | Coated material | Coating method | Shape retention of magnetic core | State of coating film | Thickness of coating film (μm) Corner | Thickness of coating film (μm) Other portions | Resistance (Ω) | Shape of B-H Hysteresis loop |
|---|---|---|---|---|---|---|---|---|
| Comp. Ex. 4 | V1 | dipping | good not changed under load | very thin/ appearance of unevenness particularly on laminated side surface | 5 | 15 | 0.089 | bad |
| Comp. Ex. 5 | V2 | dipping | good not changed under load | very thin/ appearance of unevenness particularly on laminated side surface | 4 | 9 | 0.045 | bad |
| Comp. Ex. 6 | V3 | dipping | not strained but easily deformed under load | very thin/ appearance of unevenness particularly on laminated side surface | 3 | 9 | 0.078 | bad |

Synthesis Example 2

As shown in Table 5, resins P21 to P33 having recurring units represented by the chemical formulas (11) to (21) in their main chain skeletons and having logarithmic viscosities described in Table 5 were prepared by synthesis or the like. Properties (glass transition temperature, tensile strength at 30° C. after annealing of 365° C. and 2 hours in nitrogen atmosphere, loss in weight due to thermal decomposition after annealing of 365° C. and 2 hours in nitrogen atmosphere, melt viscosity at 365° C.) of the resins were measured. The results are set forth in Table 5.

TABLE 5

| Resin No. | Structure | Logarithmic viscosity [η] (dl/g) | Glass transition temperature Tg (° C.) | Tensile strength (MPa) | Loss in weight (wt %) | Melt viscosity (Pa · s) |
|---|---|---|---|---|---|---|
| P21 | chemical formula (11) | 0.45 | 235 | 97 | 0.34 | 1450 |
| P22 | chemical formula (12) | 0.81 | 196 | 90 | 0.26 | 90 |
| P23 | chemical formula (13) | 0.59 | 217 | 102 | 0.26 | 1500 |
| P24 | chemical formula (14) | 0.44 | 285 | 110 | 0.19 | 3300 |
| P25 | chemical formula (15) | 0.31 | 358 | 111 | 0.15 | 5500 |
| P26 | chemical formula (16) | 0.45 | 260 | 140 | 1.21 | 2550 |
| P27 | chemical formula (17) | 0.49 | 225 | 72 | 0.15 | 650 |
| P28 | chemical formula (18) | 0.57 | 190 | 55 | 0.31 | 980 |
| P29 | chemical formula (19) | 0.45 | 285 | 76 | 0.14 | 820 |
| P30 | chemical formula (20) | 0.45 | 143 | 95 | 0.02 | 1420 |
| P31 | chemical formula (21) | 0.75 | 193 | 20 | 3.8 | 520 |
| P32 | chemical formula (12) | 0.51 | 194 | 88 | 0.27 | 4.5 |
| P33 | chemical formula (11) | 1.35 | 236 | 100 | 0.29 | 55000 |

Then, using the resins P21 to P33, compositions C21 to C35 were prepared as shown in Table 6. For pulverizing the resins, a freeze pulverization method using an impact pulverizer and/or a method using a wet jet mill (Sugino Machine Ulthimaizer System) was used. The volume-based average particle diameter of the resin particles, ratio between the resin particles and water in the compositions, and properties of the compositions are set forth in Table 6. The composition C32 is a composition obtained by storing the composition C21 at 30° C. for 6 months.

TABLE 6

| Composition No. | Resin Resin No. | Resin Average particle diameter (μm) | Compounding ratio Particles of resin (part(s) by weight) | Compounding ratio Water (part(s) by weight) | Property of composition |
|---|---|---|---|---|---|
| C21 | P21 | 8.2 | 100 | 180 | Paste |
| C22 | P21 | 42 | 100 | 0 | powder |
| C23 | P22 | 7.8 | 100 | 180 | Paste |
| C24 | P23 | 9.2 | 100 | 180 | Paste |
| C25 | P24 | 9.1 | 100 | 180 | Paste |
| C26 | P25 | 8.7 | 100 | 180 | Paste |

TABLE 6-continued

| Composition No. | Resin | | Compounding ratio | | Property of composition |
|---|---|---|---|---|---|
| | Resin No. | Average particle diameter (μm) | Particles of resin (part(s) by weight) | Water (part(s) by weight) | |
| C27 | P26 | 8.5 | 100 | 180 | Paste |
| C28 | P27 | 7.9 | 100 | 180 | Paste |
| C29 | P28 | 9.9 | 100 | 180 | Paste |
| C30 | P29 | 8.6 | 100 | 180 | Paste |
| C31 | P30 | 8.7 | 100 | 180 | Paste |
| C32 | composition obtained by storing C21 at ordinary temperature for 6 months | | | | |
| C33 | P31 | 8.2 | 100 | 180 | Paste |
| C34 | P32 | 8.7 | 100 | 180 | Paste |
| C35 | P33 | 9.4 | 100 | 180 | Paste |

Then, a polyamide acid varnish having a recurring unit represented by the chemical formula (22) in its main chain skeleton, which was synthesized by dissolving pyromellitic dianhydride, 3,3',4,4'-biphenyltetracarboxylic dianhydride and 4,4,-bis(3-aminophenoxy)biphenyl in N,N'-dimethylacetamide at ordinary temperature, a U varnish available from Ube Industries, Ltd. and a siloxane-modified polyimide resin varnish synthesized in accordance with the working example of Japanese Patent Laid-Open Publication No. 251439/1990 were prepared as a varnish V21, a varnish 22 and a varnish V23, respectively, as shown in Table 7. Further, a varnish V24 was prepared by storing the varnish V21 for 6 months at 30° C.

TABLE 7

| Varnish No. | | η inh |
|---|---|---|
| V21 | amide acid varnish of chemical formula (22) | 0.44 |
| V22 | U varnish | 0.45 |
| V23 | siloxane-modified polyimide resin varnish described in Japanese Patent Laid-Open Publication No. 251439/1990 | 0.59 |
| V24 | varnish obtained by storing V21 at ordinary temperature for 6 months | |

Example 12

Figure 7:
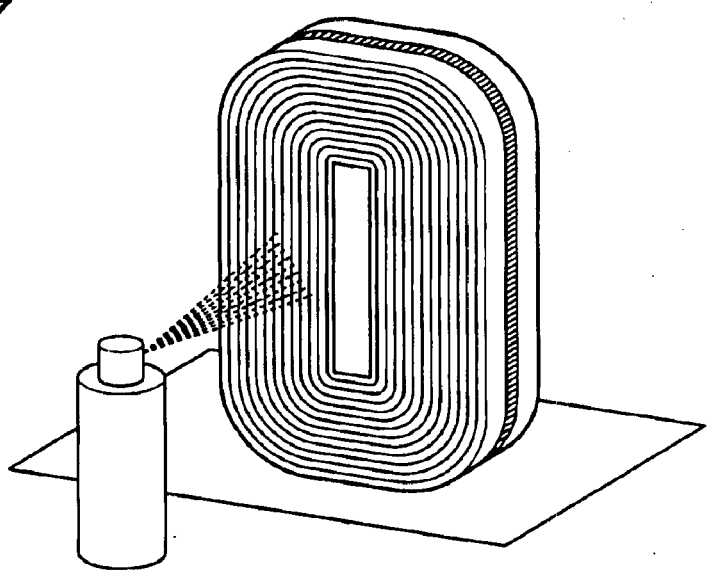
FIG. 7 is a view showing an example of a step of coating a core material with a composition of the present invention.

Plural amorphous alloy ribbons (each ribbon having a width of 142 mm and a thickness or 25 μm as shown in FIG. 5) having a composition ratio Fe:Si:B of 78:9:13 by atom were laminated, and using the resulting laminate, a core material of 55 kg was prepared by a usual method. The shape and the size of the core material are shown in FIG. 6. At the center of the iron core (core material), a fitment was used as a spacer, and on the outer peripheral portion, a fitment was also used to fasten the amorphous alloy ribbons so that they should not be loosened. Then, the whole of the laminated side surfaces of the core material was coated with the resin composition C21 shown in Table 6 by a spraying method using a spray gun (Olympus SC-110) and compressed air. The coating operation is schematically shown in FIG. 7. During the coating operation, sagging of the composition was not found at all, and coating could be carried out uniformly and rapidly. The coating time was about 3 minutes, and the coating thickness was about 120 μm. The core material coated with the composition was heated up to 365° C. from 30° C. over a period of 1 hour at a constant rate in a nitrogen atmosphere and held at 365° C. for 2 hours to perform annealing heat treatment, followed by allowing the core material to cool. After the cooling, the fixing spacer, etc. were removed. As a result, the shape retention of the resulting magnetic core was good, and even when a load of 10 kg was applied to the top of the magnetic core in the same standing state as in the coating operation, any influence was not exerted on the shape retention. In the magnetic core, the proportion of the area of the laminated side surfaces adhesion coated with the resin was 100%, the coating film was uniform, and the thickness of the coating film was 102 μm. The laminated ribbons constituting the magnetic core were separated from each other. Then, the surfaces of the amorphous alloy ribbons were visually observed, and the coated portions produced by penetration of the resin were measured. In each of the outer peripheral portion, the inner peripheral portion and the intermediate portion between them, the proportion of the coated portions was almost equal and was 2.5% on an average. Measurement of the core loss resulted in 0.290 W/kg. When this core loss was compared with a blank core loss 0.250 W/kg obtained by the same process including annealing heat treatment except that the resin composition was not applied, the core loss increase ratio was 16%. The results are set forth in Table 8.

Example 13

Examination was made in the same manner as in Example 12, except that the coated area was reduced to 50% by masking the laminated side surfaces of the core material with a net. The results are set forth in Table 8. The coating workability and the shape retention of the magnetic core after the heat annealing treatment were good. Moreover, the core loss increase ratio was low and 16%, and it was excellent.

Example 14

Examination was made in the same manner as in Example 12, except that the coating method was changed to a troweling method. The results are set forth in Table 8. Although the coating operation took 10 minutes, the coating workability and the shape retention of the magnetic core after the heat annealing treatment were good. Moreover, the core loss increase ratio was low and 16%, and it was excellent.

Example 15

Examination was made in the same manner as in Example 12, except that a powder composition was used and coating was carried out by a usual electrostatic powder coating method. The results are set forth in Table 8. The coating workability and the shape retention of the magnetic core after the heat annealing treatment were good. Moreover, the core loss increase ratio was low and 16%, and it was excellent.

Examples 16 to 25

Examination was made in the same manner as in Example 12, except that the resin composition was replaced with each of the compositions C23 to C32 shown in Table 6. The results are set forth in Table 8. In any case, the coating workability and the shape retention of the magnetic core after the heat annealing treatment were good. Moreover, the core loss increase ratio was low and 16 to 28%, and it was excellent.

Comparative Example 7

Examination was made in the same manner as in Example 12, except that the resin composition was replaced with the composition C33 shown in Table 6. The results are set forth in Table 8. The coating workability was good similarly to the example using the resin composition C21, but when the fixing spacer, etc. were removed after the annealing heat treatment, the magnetic core was strained. When a load of 10 kg was applied to the top of the magnetic core in the standing state, a part of the resin coating film peeled off and the magnetic core was further strained. In addition, the coating film partially suffered crazing or peeling after the heat treatment. The core loss increase ratio was 75%, so that the core loss properties were bad.

Comparative Example 8

Examination was made in the same manner as in Example 12, except that the resin composition was replaced with the composition C34 shown in Table 6. The results are set forth in Table 8. The coating workability was good similarly to the example using the resin composition C21. When the fixing spacer, etc. were removed after the annealing heat treatment, the shape retention of the magnetic core was good, and even when a load of 10 kg was applied to the top of the magnetic core in the standing state, any influence was not exerted on the shape retention. On the resin coating film after the annealing heat treatment, however, there were traces of resin sagging during the heating, and a part of the resin became solid masses on the lower part of the coating surface. On the surfaces of the amorphous alloy ribbons, many coated portions probably formed by penetration of the resin were observed, and the proportion of the coated portions was high and 12%. The core loss increase ratio was 51%, so that the core loss properties were bad.

Comparative Example 9

Examination was made in the same manner as in Example 12, except that the resin composition was replaced with the composition C35 shown in Table 6. The results are set forth in Table 8. The coating workability was good similarly to the example using the resin composition C21, but when the fixing spacer, etc. were removed after the annealing heat treatment, the magnetic core was slightly strained. When a load of 10 kg was applied to the top of the magnetic core in the standing state, a gap was partially produced between the core material and the coating film. On a part of the resin coating film after the annealing heat treatment, there was some unevenness. The core loss increase ratio was 53%, so that the core loss properties were bad.

Comparative Examples 10 and 11

Examination was made in the same manner as in Example 12, except that the resin composition C21 was replaced with each of the varnishes V21 to V22 shown in Table 7 and the coating method was changed to a brushing method from the spraying method. The results are set forth in Table 8. In the application of the varnish, a part of the varnish sagged because of the vertical coating surface, and it was difficult to form a film of an arbitrary thickness. In addition, a part of the varnish seemed to penetrate between layers of the amorphous alloy ribbons. The coating operation took about 10 minutes. It was difficult to apply the varnish in a large thickness, and after the coating operation, unevenness of the laminated side surface of the core material appeared. Although the shape retention of the magnetic core after the annealing heat treatment was good, the resin coating film was extremely thin and the thickness was less than 10 µm. Also after the annealing heat treatment, unevenness of the laminated side surface of the core material appeared similarly to the magnetic core after the coating operation. On the surfaces of the amorphous alloy ribbons, many coated portions probably formed by penetration of the resin were observed. As a result of visual observation, the proportion of the coated portions was high and 21 to 25%. The core loss increase ratio was 88 to 98%, so that the core loss properties were bad.

Comparative Example 12

Examination was made in the same manner as in Example 12, except that the resin composition C21 was replaced with the varnish V23 shown in Table 7 and the coating method was changed to a brushing method from the spraying method. The results are set forth in Table 8. In the application of the varnish, a part of the varnish sagged because of the vertical coating surface, and it was difficult to form a film of an arbitrary thickness. In addition, a part of the varnish seemed to penetrate between layers of the amorphous alloy ribbons. The coating operation took about 10 minutes. It was difficult to apply the varnish in a large thickness, and after the coating operation, unevenness of the laminated side surface of the core material appeared. When the fixing spacer, etc. were removed after the annealing heat treatment, strain of the magnetic core was not found, but when a load of 10 kg was applied to the top of the magnetic core in the standing state, a part of the magnetic core was easily deformed. The resin coating film was extremely thin and the thickness was less than 10 µm. Also after the annealing heat treatment, unevenness of the laminated side surface of the core material appeared similarly to the magnetic core after the coating operation. On the surfaces of the amorphous alloy ribbons, many coated portions probably formed by penetration of the resin were observed. As a result of visual observation, the proportion of the coated portions was high and 26%. The core loss increase ratio was 81%, so that the core loss properties were bad.

Comparative Example 13

Examination was made in the same manner as in Example 12, except that the resin composition C21 was replaced with the varnish V24 shown in Table 7 and the coating method was changed to a brushing method from the spraying method. The results are set forth in Table 8. The varnish partially became a gel and partially became opaque. In the application of the varnish, a part of the varnish sagged because of the vertical coating surface, and it was difficult to form a film of an arbitrary thickness. In addition, a part of the varnish seemed to penetrate between layers of the amorphous alloy ribbons. The coating operation took about 10 minutes. It was difficult to apply the varnish in a large thickness, and after the coating operation, unevenness of the laminated side surface of the core material appeared. When the fixing spacer, etc. were removed after the annealing heat treatment, strain of the magnetic core was not found, but when a load of 10 kg was applied to the top of the magnetic core in the standing state, a part of the magnetic core was easily deformed. The resin coating film was extremely thin and the thickness was less than 10 µm. Also after the annealing heat treatment, unevenness of the laminated side surface of the core material appeared similarly to the magnetic core after the coating operation. On the surfaces of the amorphous alloy ribbons, many coated portions probably formed by penetration of the resin were observed. As a result of visual observation, the proportion of the coated portions was high and 24%. The core loss increase ratio was 84%, so that the core loss properties were bad.

TABLE 8

| | Coated material | Coating method | Proportion of coated area on laminated side surface | Sagging | Operation time (minutes(s)) | State of coated surface |
|---|---|---|---|---|---|---|
| Ex. 12 | C21 | Spraying | 100 | not observed | approx. 3 | uniform |
| Ex. 13 | C21 | Spraying | 50 | not observed | approx. 3 | uniform |
| Ex. 14 | C21 | troweling | 100 | not observed | approx. 10 | almost uniform |
| Ex. 15 | C22 | electrostatic powder coating | 100 | not observed | approx. 3 | uniform |
| Ex. 16 | C23 | Spraying | 100 | not observed | approx. 3 | uniform |
| Ex. 17 | C24 | Spraying | 100 | not observed | approx. 3 | uniform |
| Ex. 18 | C26 | Spraying | 100 | not observed | approx. 3 | uniform |
| Ex. 19 | C26 | Spraying | 100 | not observed | approx. 3 | uniform |
| Ex. 20 | C27 | Spraying | 100 | not observed | approx. 3 | uniform |
| Ex. 21 | C28 | Spraying | 100 | not observed | approx. 3 | uniform |
| Ex. 22 | C29 | Spraying | 100 | not observed | approx. 3 | uniform |
| Ex. 23 | C10 | Spraying | 100 | not observed | approx. 3 | uniform |
| Ex. 24 | C31 | Spraying | 100 | not observed | approx. 3 | uniform |
| Ex. 25 | C32 | Spraying | 100 | not observed | approx. 3 | uniform |
| Comp. Ex. 7 | C33 | Spraying | 100 | not observed | approx. 3 | uniform |
| Comp. Ex. 8 | C34 | Spraying | 100 | not observed | approx. 3 | uniform |
| Comp. Ex. 9 | C35 | Spraying | 100 | not observed | approx. 3 | uniform |
| Comp. Ex. 10 | V21 | brushing | 100 | observed | approx. 10 | appearance of unevenness of laminated side surface |
| Comp. Ex. 11 | V22 | brushing | 100 | observed | approx. 10 | appearance of unevenness of laminated side surface |
| Comp. Ex. 12 | V23 | brushing | 100 | observed | approx. 10 | appearance of unevenness of laminated side surface |
| Comp. Ex. 13 | V24 | brushing | 100 | observed | approx. 10 | appearance of unevenness of laminated side surface |

| | After annealing heat treatment | | | | | | |
|---|---|---|---|---|---|---|---|
| | Proportion of coated area on laminated side surface | Shape retention of magnetic core | State of coating film | Thickness of coating film ($\mu$m) | Proportion of coated area on surface of ribbon (%) | Core loss (W/kg) | Core loss increase ratio (%) |
| Ex. 12 | 100 | good not changed under load | uniform | 102 | 2.5 | 0.290 | 16 |
| Ex. 13 | 50 | good not changed under load | uniform | 102 | 2.6 | 0.290 | 16 |
| Ex. 14 | 100 | good not changed under load | uniform | 101 | 2.5 | 0.290 | 16 |
| Ex. 15 | 100 | good not changed under load | uniform | 102 | 2.6 | 0.290 | 16 |
| Ex. 16 | 100 | good not changed under load | uniform | 105 | 5.3 | 0.290 | 16 |
| Ex. 17 | 100 | good not changed under load | uniform | 98 | 2.9 | 0.303 | 21 |
| Ex. 18 | 100 | good not changed under load | uniform | 105 | 1.9 | 0.320 | 28 |
| Ex. 19 | 100 | good not changed under load | uniform | 98 | 0.9 | 0.320 | 28 |
| Ex. 20 | 100 | good not changed under load | uniform | 109 | 2.2 | 0.318 | 27 |
| Ex. 21 | 100 | good not changed under load | uniform | 107 | 3.8 | 0.303 | 21 |
| Ex. 22 | 100 | good not changed under load | uniform | 95 | 3.6 | 0.303 | 21 |
| Ex. 23 | 100 | good not changed under load | uniform | 98 | 3.1 | 0.318 | 27 |

TABLE 8-continued

| | | | | | | | |
|---|---|---|---|---|---|---|---|
| Ex. 24 | 100 | good not changed under load | uniform | 100 | 3.5 | 0.303 | 21 |
| Ex. 25 | 100 | good not changed under load | uniform | 100 | 3.1 | 0.290 | 16 |
| Comp. Ex. 7 | 100 | strained peeling of coating film | uniform | 104 | 4.9 | 0.438 | 75 |
| Comp. Ex. 8 | 100 | good not changed under load | sagged | 65 | 12 | 0.378 | 51 |
| Comp. Ex. 9 | 100 | slightly strained/ partially gapped under load | slightly uneven | 94 | 0.2 | 0.383 | 53 |
| Comp. Ex. 10 | 100 | good not changed under load | appearance of unevenness of laminated side surface | less than 10 | 21 | 0.470 | 88 |
| Comp. Ex. 11 | 100 | good not changed under load | appearance of unevenness of laminated side surface | less than 10 | 25 | 0.495 | 98 |
| Comp. Ex. 12 | 100 | not strained but easily deformed under load | appearance of unevenness of laminated side surface | less than 10 | 26 | 0.453 | 81 |
| Comp. Ex. 13 | 100 | not strained but easily deformed under load | appearance of unevenness of laminated side surface | less than 10 | 24 | 0.460 | 84 |

Synthesis Example 3

As shown in Table 9, resins P41 to P55 having recurring units represented by the chemical formulas (11) to (19) in their main chain skeletons and having logarithmic viscosities described in Table 9 were prepared by synthesis or the like. Properties (glass transition temperature, tensile strength at 30° C. after annealing of 365° C. and 2 hours in nitrogen atmosphere, loss in weight due to thermal decomposition after annealing of 365° C. and 2 hours in nitrogen atmosphere, melt viscosity at 365° C., heat of fusion, organic solvent residue in resin) of the resins were measured. The results are set forth in Table 1. The resins P50 and P55 were prepared by lowering the drying temperature for removing the cresol solvent in the synthesis than that in the resin P44.

TABLE 9

| Resin No. | Structure | Logarithmic viscosity [η] (dl/g) | Glass transition temperature Tg (° C.) | Tensile strength (Mpa) | Loss in weight (wt %) | Melt viscosity (Pa · s) | Heat of fusion (J/g) | Organic solvent residue (wt %) |
|---|---|---|---|---|---|---|---|---|
| P41 | chemical formula (11) | 0.45 | 235 | 97 | 0.34 | 880 | not detected | not more than 0.01 |
| P42 | chemical formula (12) | 0.87 | 196 | 90 | 0.26 | 220 | not detected | not more than 0.01 |
| P43 | chemical formula (13) | 0.59 | 217 | 102 | 0.26 | 1500 | not detected | not more than 0.01 |
| P44 | chemical formula (14) | 0.51 | 285 | 110 | 0.2 | 3300 | not detected | not more than 0.01 |
| P45 | chemical formula (15) | 0.45 | 260 | 140 | 1.21 | 2550 | not detected | not more than 0.01 |
| P46 | chemical formula (16) | 0.49 | 225 | 72 | 0.15 | 650 | not detected | not more than 0.01 |
| P47 | chemical formula (17) | 0.57 | 190 | 55 | 0.31 | 980 | not detected | not more than 0.01 |
| P48 | chemical formula (18) | 0.45 | 285 | 76 | 0.14 | 820 | not detected | not more than 0.01 |

TABLE 9-continued

| Resin No. | Structure | Logarithmic viscosity [η] (dl/g) | Glass transition temperature Tg (° C.) | Tensile strength (Mpa) | Loss in weight (wt %) | Melt viscosity (Pa · s) | Heat of fusion (J/g) | Organic solvent residue (wt %) |
|---|---|---|---|---|---|---|---|---|
| P49 | chemical formula (19) | 0.45 | 245 | 98 | 0.31 | 1020 | 5.1 | not more than 0.01 |
| P50 | chemical formula (11) | 0.45 | 235 | 92 | 0.38 | 760 | not detected | 0.71 |

Then, using the resins P41 to P55, compositions C41 to C58 containing particles of the resins and water were prepared as shown in Table 10. For pulverizing the resins, a freeze pulverization method using an impact pulverizer and/or a method using a wet jet mill (Sugino Machine Ulthimaizer System) was used. Properties (volume-based average particle diameter and surface area per unit weight) of the resin particles, and the resin content in the compositions are set forth in Table 2. The composition C53 is a composition obtained by storing the composition C41 at 30° C. for 6 months.

TABLE 10

| Composition No. | Resin No. | Average particle diameter (μm) | Surface area (m²/g) | Resin content (wt %) |
|---|---|---|---|---|
| C41 | P41 | 8.2 | 0.38 | 35 |
| C42 | P42 | 7.8 | 0.42 | 35 |
| C43 | P43 | 9.2 | 0.39 | 35 |
| C44 | P44 | 9.1 | 0.35 | 35 |
| C45 | P45 | 8.7 | 0.36 | 35 |
| C46 | P46 | 8.5 | 0.36 | 35 |
| C47 | P47 | 7.9 | 0.41 | 35 |
| C48 | P48 | 10.2 | 0.35 | 35 |
| C49 | P49 | 8.6 | 0.39 | 35 |
| C50 | P50 | 8.7 | 0.39 | 35 |
| C51 | P41 | 4.1 | 0.98 | |
| C52 | P41 | 26.7 | 0.13 | 45 |
| C53 | composition obtained by storing C41 at ordinary temperature for 6 months | | | |

Then, a polyamide acid varnish having a recurring unit represented by the chemical formula (22) in its main chain skeleton, which was synthesized by dissolving pyromellitic dianhydride, 3,3',4,4'-biphenyltetracarboxylic dianhydride and 4,4'-bis(3-aminophenoxy)biphenyl in N,N'-dimethylacetamide at ordinary temperature, a U varnish available from Ube Industries, Ltd. and a siloxane-modified polyimide resin varnish synthesized in accordance with the working example of Japanese Patent Laid-Open Publication No. 251439/1990 were prepared as a varnish V41, a varnish V42 and a varnish V43, respectively, as shown in Table 11. Further, a varnish V44 was prepared by storing the varnish V41 at 30° C. for 6 months.

TABLE 11

| Varnish No. | | η inh |
|---|---|---|
| V41 | amide acid varnish of chemical formula (22) | 0.44 |
| V42 | U varnish | 0.45 |
| V43 | siloxane-modified polyimide resin varnish described in Japanese Patent Laid-Open Publication No. 251439/1990 | 0.6 |
| V44 | varnish obtained by storing V41 at ordinary temperature for 6 months | |

Example 26

Plural amorphous alloy ribbons (width: 15 cm, thickness: 25 μm) having a composition ratio Fe:Si:B of 78:9:13 by atom were laminated, and using the resulting laminate, a core material (iron core) of about 60 kg made of a roll of the amorphous alloy ribbons was prepared by a usual method. The shape and the size of the amorphous ribbon core are shown in FIG. 6. At the center of the core material (iron core), a fitment was used as a spacer, and on the outer peripheral portion, a fitment was also used to fasten the amorphous alloy ribbons so that they should not be loosened. Then, the laminated side surfaces of the amorphous ribbon core were coated with the resin composition C41 shown in Table 2 by a spraying method using a spray gun (OLYMPOS SC-110) and compressed air. The coating operation is schematically shown in FIG. 10. During the coating operation, sagging of the composition was not found at all, and coating could be carried out uniformly and rapidly. The coating time was about 3 minutes, and the coating thickness was about 120 μm. The amorphous ribbon core coated with the composition was heated up to 360° C. from ordinary temperature at a constant rate over a period of 1 hour in a nitrogen atmosphere and held at 360° C. for 2 hours to perform annealing heat treatment, followed by allowing the core material to cool. After the cooling, the fixing spacer, etc. were removed. As a result, the shape retention of the core material made of a roll of the amorphous alloy ribbons was good, and even when a load of 10 kg was applied to the top of the amorphous ribbon core in the same standing state as in the coating operation, any influence was not exerted on the shape retention. The coating film was uniform and the thickness of the film was 102 μm. Measurement of the iron loss resulted in 0.295 W/kg, and a blank iron loss obtained by the same process including annealing heat treatment except that the resin composition was not applied was 0.250 W/kg, so that the iron loss increase ratio due to the coating film was 18%.

Examples 27 to 37

Examination was made in the same manner as in Example 26, except that the resin composition was replaced with each of the compositions C42 to C52 shown in Table 10. The results are set forth in Table 11. In any case, the coating workability and the shape retention of the amorphous ribbon core after the heat annealing treatment were good. Moreover, the iron loss increase ratio was low and 18 to 22%, and it was excellent.

Examples 38

Examination was made in the same manner as in Example 26, except that the coating method was changed to a troweling method. The results are set forth in Table 11. Although the coating operation took 10 minutes, the coating workability and the shape retention of the amorphous ribbon core after the heat annealing treatment were good. Moreover, the iron loss increase ratio was low and 18%, and it was excellent.

Example 39

Examination was made in the same manner as in Example 26, except that the resin composition was replaced with the composition C53 shown in Table 10. The results are set forth in Table 11. The coating workability and the shape retention of the amorphous ribbon core after the heat annealing treatment were good. Moreover, the iron loss increase ratio was low and 18%, and it was excellent.

Comparative Examples 14 and 15

Examination was made in the same manner as in Example 25, except that the resin composition C41 was replaced with each of the varnishes V41 to V42 shown in Table 11 and the coating method was changed to a brushing method from the spraying method. The results are set forth in Table 12. In the application of the varnish, a part of the varnish sagged because of the vertical coating surface, and it was difficult to form a film of an arbitrary thickness. Further, a part of the varnish seemed to penetrate between layers of the amorphous alloy ribbons. The coating operation took about 10 minutes. It was difficult to apply the varnish in a large thickness, and after the coating operation, unevenness of the laminated side surface of the amorphous ribbon core appeared. Although the shape retention of the amorphous ribbon core after the annealing heat treatment was good, the resin coating film was extremely thin and the thickness was not more than 20 μm. Also after the annealing heat treatment, unevenness of the laminated side surface of the amorphous ribbon core (core material) appeared similarly to the amorphous ribbon core after the coating operation. The iron loss was 0.410 to 0.433 W/kg and the iron loss increase ratio was 64 to 73%, so that the core loss properties were bad.

Comparative Example 16

Examination was made in the same manner as in Example 25, except that the resin composition C41 was replaced with the varnish V43 shown in Table 11 and the coating method was changed to a brushing method from the spraying method. The results are set forth in Table 16. In the application of the varnish, a part of the varnish sagged because of the vertical coating surface, and it was difficult to form a film of an arbitrary thickness. Further, a part of the varnish seemed to penetrate between layers of the amorphous alloy ribbons. The coating operation took about 10 minutes. It was difficult to apply the varnish in a large thickness, and after the coating operation, unevenness of the laminated side surface of the amorphous ribbon core appeared. When the fixing spacer, etc. were removed after the annealing heat treatment, strain of the amorphous ribbon core was not found, but when a load of 10 kg was applied to the top of the amorphous ribbon core in the standing state, a part of the amorphous ribbon core was easily deformed. The resin coating film was extremely thin and the thickness was not more than 20 μm. Also after the annealing heat treatment, unevenness of the laminated side surface of the amorphous ribbon core (core material) appeared similarly to the amorphous ribbon core after the coating operation. The iron loss was 0.388 W/kg and the iron loss increase ratio was 55%, so that the core loss properties were bad.

Comparative Example 17

Examination was made in the same manner as in Example 25, except that the resin composition C41 was replaced with the varnish V44 shown in Table 11 and the coating method was changed to a brushing method from the spraying method. The results are set forth in Table 12. In the application of the varnish, a part of the varnish sagged because of the vertical coating surface, and it was difficult to form a film of an arbitrary thickness. Further, a part of the varnish seemed to penetrate between layers of the amorphous alloy ribbons. The coating operation took about 10 minutes. It was difficult to apply the varnish in a large thickness, and after the coating operation, unevenness of the laminated side surface of the amorphous ribbon core appeared. When the fixing spacer, etc. were removed after the annealing heat treatment, strain of the amorphous ribbon core was not found, but when a load of 10 kg was applied to the top of the amorphous ribbon core in the standing state, a part of the amorphous ribbon core was easily deformed. The resin coating film was extremely thin and the thickness was not more than 20 μm. Also after the annealing heat treatment, unevenness of the laminated side surface of the amorphous ribbon core (core material) appeared similarly to the amorphous ribbon core after the coating operation. The iron loss was 0.420 W/kg and the iron loss increase ratio was 68%, so that the core loss properties were bad.

TABLE 12

| | Coated material | Coating method | Coating operation | | |
|---|---|---|---|---|---|
| | | | Sagging | Operation time (minute(s)) | State of coated surface |
| Ex. 26 | C41 | Spraying | not observed | approx. 3 | uniform |
| Ex. 27 | C42 | Spraying | not observed | approx. 3 | uniform |

TABLE 12-continued

| | | | | | |
|---|---|---|---|---|---|
| Ex. 28 | C43 | Spraying | not observed | approx. 3 | uniform |
| Ex. 29 | C44 | Spraying | not observed | approx. 3 | uniform |
| Ex. 30 | C45 | Spraying | not observed | approx. 3 | uniform |
| Ex. 31 | C46 | Spraying | not observed | approx. 3 | uniform |
| Ex. 32 | C47 | Spraying | not observed | approx. 3 | uniform |
| Ex. 33 | C48 | Spraying | not observed | approx. 3 | uniform |
| Ex. 34 | C49 | Spraying | not observed | approx. 3 | uniform |
| Ex. 35 | C50 | Spraying | not observed | approx. 3 | uniform |
| Ex. 36 | C51 | Spraying | not observed | approx. 3 | uniform |
| Ex. 37 | C52 | Spraying | not observed | approx. 3 | uniform |
| Ex. 38 | C41 | troweling | not observed | approx. 10 | almost uniform |
| Ex. 39 | C53 | Spraying | not observed | approx. 3 | uniform |
| Comp. Ex. 14 | V41 | brushing | observed incapable of thick coating | approx. 10 | appearance of unevenness of laminated side surface |
| Comp. Ex. 15 | V42 | brushing | observed incapable of thick, coating | approx. 10 | appearance of unevenness of laminated side surface |
| Comp. Ex. 16 | V43 | brushing | observed incapable of thick coating | approx. 10 | appearance of unevenness of laminated side surface |
| Comp. Ex. 17 | V44 | brushing | observed incapable of thick coating | approx. 10 | appearance of unevenness of laminated side surface |

| | After annealing heat treatment | | | | |
|---|---|---|---|---|---|
| | Shape retention of iron core | State of coating film | Thickness of coating film (μm) | Iron loss (W/kg) | Iron loss increase ratio (%) |
| Ex. 26 | good not changed under load | uniform | 102 | 0.295 | 18 |
| Ex. 27 | good not changed under load | uniform | 105 | 0.296 | 18 |
| Ex. 28 | good not changed under load | uniform | 98 | 0.298 | 19 |
| Ex. 29 | good not changed under load | uniform | 105 | 0.306 | 22 |
| Ex. 30 | good not changed under load | uniform | 98 | 0.305 | 22 |
| Ex. 31 | good not changed under load | uniform | 109 | 0.296 | 18 |
| Ex. 32 | good not changed under load | uniform | 107 | 0.296 | 18 |
| Ex. 33 | good not changed under load | uniform | 95 | 0.303 | 21 |
| Ex. 34 | good not changed under load | uniform | 98 | 0.296 | 18 |
| Ex. 35 | good not changed under load | uniform | 100 | 0.298 | 19 |
| Ex. 36 | good not changed under load | uniform | 100 | 0.295 | 18 |
| Ex. 37 | good not changed under load | uniform | 104 | 0.295 | 18 |
| Ex. 38 | good not changed under load | uniform | 101 | 0.295 | 18 |
| Ex. 39 | good not changed under load | uniform | 98 | 0.295 | 18 |
| Comp. Ex. 14 | good not changed under load | appearance of unevenness of laminated side surface | not more than 20 | 0.410 | 64 |
| Comp. Ex. 15 | good not changed under load | appearance of unevenness of laminated side surface | not more than 20 | 0.433 | 73 |
| Comp. Ex. 16 | not strained but easily deformed under load | appearance of unevenness of laminated side surface | not more than 20 | 0.388 | 55 |
| Comp. Ex. 17 | not strained but easily deformed under load | appearance of unevenness of laminated side surface | not more than 20 | 0.420 | 68 |

Synthesis Example 4

Resins of the chemical formula (12) were prepared as shown in Table 13, and using the resins, compositions C61 to C65 were prepared as shown in Table 14. For pulverizing the resins, a freeze pulverization method using an impact pulverizer and/or a method using a wet jet mill (Sugino Machine Ulthimaizer System) was used. As an inorganic substance, fused silica particles (available from Denki Kagaku Kogyo K.K.) were used.

TABLE 13

(chemical structure of formula (12))

| Resin No. | Structure | Logarithmic viscosity (dl/g) | Glass transition temperature (° C.) | Melt viscosity at 365° C. (Pa · s) |
|---|---|---|---|---|
| P61 | chemical formula (12) | 0.81 | 196 | 90 |
| P62 | chemical formula (12) | 0.51 | 196 | 4.5 |

TABLE 14

| Composition No. | Resin Type | Surface area per unit weight Sp (m$^2$/g) | Average particle diameter ($\mu$m) | Inorganic substance Type | Surface area per unit weight Sf (m$^2$/g) | Average particle diameter ($\mu$m) | Liquid Type | Resin Cp | Inorganic substance Cf | Liquid | (Sp · Cp)/(Sf · Cf) |
|---|---|---|---|---|---|---|---|---|---|---|---|
| C61 | P61 | 0.25 | 42 | fused silica | 0.41 | 32 | none | 67 | 33 | 0 | 1.24 |
| C62 | P61 | 1.1 | 8.2 | fused silica | 2.1 | 5.7 | water | 30 | 15 | 55 | 1.05 |
| C63 | P62 | 0.26 | 43 | fused silica | 0.41 | 32 | none | 67 | 33 | 0 | 1.29 |
| C64 | P61 | 0.25 | 42 | fused silica | 0.41 | 32 | none | 20 | 80 | 0 | 0.15 |
| C65 | P61 | 0.25 | 42 | fused silica | 0.41 | 32 | none | 96 | 4 | 0 | 14.63 |

Example 40

An amorphous alloy ribbon (width: 10 mm, thickness: 25 $\mu$m) having a composition ratio Fe:Si:B of 78:9:13 by atom was rolled to prepare a core material having a thickness of 10 mm, an inner diameter of 15 mm, an outer diameter of 25 mm and a weight of 19.5 g. The whole outer surface of the core material was almost uniformly coated with the composition C61 shown in Table 14 by a usual electrostatic powder coating method. Then, the core material was heated up to 400° C. from 30° C. at a constant rate over a period of 1 hour in a nitrogen atmosphere and held at 400° C. for 2 hours to perform annealing heat treatment, followed by allowing the core material to cool.

The resulting magnetic core had a uniform coating film on the whole outer surface, and even when a load of 500 g was applied, the magnetic core was not deformed at all. The magnetic core was cut and the thickness of the coating film was observed. As a result, the thickness at the corner portion was 100 $\mu$m, and the thickness at portions other than the corner portion was 102 $\mu$m and was almost uniform independent of the place. A conductor wire made of metallic copper was coiled around the magnetic core, and as a result, no damage was observed on the conductor wire. Further, a value of resistance between the conductor wire and the magnetic core was measured by the use of a resistance value measuring device, and as a result, it was not less than 1000000$\Omega$. Taking a resistance value 1.7 micro $\Omega$·cm of copper and a resistance value 1.3 micro $\Omega$·m of an amorphous alloy ribbon into consideration, the insulating properties proved to have no problem. The B-H hysteresis loop was observed under the conditions of a frequency of 100 KHz and a magnetic flux density of 1.0 tesla. As a result, the shape of the loop was the same as that of a proper loop of the magnetic core, so that it has been confirmed that the insulating properties exerted no evil influence on the function of the magnetic core.

Example 41

Examination was made in the same manner as in Example 40, except that the resin composition was replaced with the composition C62 shown in Table 14 and the coating method was changed to a spraying method. The results are set forth in Table 15. The shape retention of the magnetic core after the annealing heat treatment was good. Moreover, the thickness of the coating film, insulating properties and the shape of the B-H hysteresis loop were also good.

Example 42

Examination was made in the same manner as in Example 40, except that the resin composition was replaced with the composition C62 shown in Table 14 and the coating method was changed to a dipping method. The results are set forth in Table 15. The shape retention of the magnetic core after the annealing heat treatment was good. Moreover, the thickness of the coating film, insulating properties and the shape of the B-H histeresis loop were also good.

Examples 43 to 45

Examination was made in the same manner as in Example 40, except that the resin composition was replaced with each of the compositions C63 to C65 shown in Table 14. The results are set forth in Table 15. The shape retention of the magnetic core after the annealing heat treatment was good. Moreover, the thickness of the coating film, insulating properties and the shape of the B-H histeresis loop were also good.

Magnetic Core A

Figure 2:
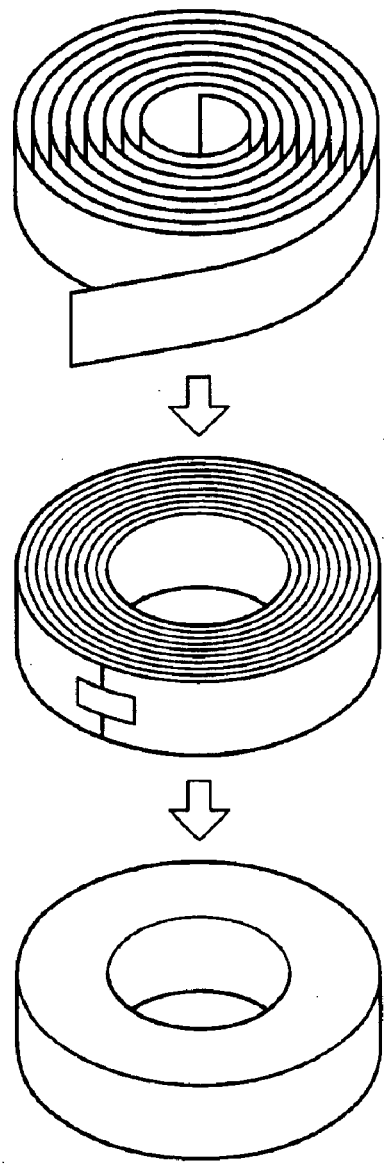
FIG. 2 is a view showing an example of a procedure of adhesion fabrication of a magnetic core.

The heat-resistant adhesive composition prepared above was applied onto the side surfaces of a roll obtained by rolling a magnetic thin plate made of a Fe-based amorphous metal. In FIG. 2, a procedure of fabrication of the magnetic core using the heat-resistant adhesive composition is shown.

As the magnetic thin plate (amorphous alloy thin plate), Honeywell Metgleas 2605S-2 (trade name, thickness: 25 $\mu$m) was used. The amorphous alloy thin plate was cut into strips having a width of 5 mm, and the strips were wound around an axis having a diameter of 9 mm to give a roll in the toroidal shape having an outer diameter of 15 mm.

The end of the amorphous alloy thin strip was temporarily fixed by a polyimide adhesive tape.

The roll with the heat-resistant adhesive composition applied onto the side surfaces was placed in an electric oven in a nitrogen atmosphere and subjected to heat treatment. In the heat treatment, the roll was heated up to a temperature of 400° C. over a period of 2.5 hours, held at 400° C. for 2 hours and then slowly cooled. The roll taken out of the electric oven had coatings of the heat-resistant adhesive composition on the side surfaces, and even when a pressure of 1 kg was applied to the roll in the direction of a diameter of the roll, the roll was not deformed. This magnetic core is referred to as a magnetic core A.

TABLE 15

| | Coated material | Coating method | Shape retention of magnetic core | State of coating film | Thickness of coating film ($\mu$m) | | Resistance ($\Omega$) | B-H hysteresis loop |
|---|---|---|---|---|---|---|---|---|
| | | | | | Corner | Other portions | | |
| Ex. 40 | C61 | Electrostatic powder coating | good not changed under load | uniform | 100 | 102 | not less than 1000000 | good |
| Ex. 41 | C62 | spraying | good not changed under load | uniform | 162 | 150 | not less than 1000000 | good |
| Ex. 42 | C62 | dipping | good not changed under load | uniform | 189 | 180 | not less than 1000000 | good |
| Ex. 43 | C63 | Electrostatic powder coating | good not changed under load | uniform | 80 | 98 | not less than 1000000 | good |
| Ex. 44 | C64 | Electrostatic powder coating | good not changed under load | uniform | 103 | 95 | not less than 1000000 | good |
| Ex. 45 | C65 | Electrostatic powder coating | good not changed under load | uniform | 78 | 108 | not less than 1000000 | good |

Examples 46 and 47, Comparative Examples 18, 19 and 20

Adhesive Resin Composition

To 50 parts by weight of a thermoplastic polyimide powder (AURUM PD450M, available from Mitsui Chemicals, Inc.) having a glass transition temperature (Tg) of 200° C., 45 parts by weight of water and 5 parts by weight of hydrophilic Aerosil were added, and they were mixed by a mixer to prepare a heat-resistant adhesive composition.

The Aerosil was added for the purpose of imparting thixotropic properties.

When the heat-resistant adhesive composition prepared above was subjected to heat treatment at 40° C. for 2 hours, the coating property adjusting agent was evaporated. Then, when the temperature was returned to room temperature, the adhesive resin composition that is a mixture of the resin and the filler was obtained.

The elastic modulus of the resulting adhesive composition was measured, and as a result, it was not less than 650 MPa in the temperature range of 0 to 60° C.

Magnetic Core B

Figure 3:
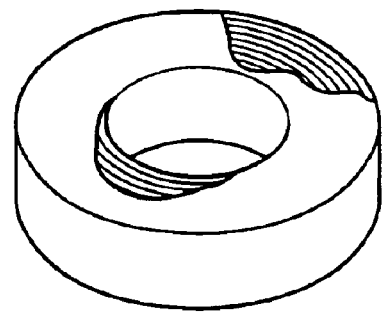
FIG. 3 is a view showing an example of an appearance of a coated core material.

The heat-resistant adhesive composition prepared above was applied onto the side surfaces of the above-mentioned roll in such a manner that the layers of the magnetic thin strips were partially exposed, as shown in FIG. 3. The roll with the composition was subjected to heat treatment in the same manner as described above. Thus, a magnetic core B was prepared.

Magnetic Core C

An epoxy adhesive (Three Bond 2287) that is commercially available as an adhesive for a magnetic core was used for comparison. The roll previously annealed was immersed in the epoxy adhesive, then placed in a deaerator and deaerated to allow the epoxy adhesive to penetrate between the layers of the amorphous alloy thin strips. The roll with the epoxy adhesive was taken out of the deaerator, then placed in a dryer, cured at 150° C. for 8 hours and taken out. Thus, a magnetic core C was prepared.

Magnetic Core D

The side surfaces of the above-mentioned roll were coated with a siloxane-modified polyimide adhesive disclosed in Japanese Patent Laid-Open Publication No. 251439/1990. Then, the roll with the adhesive was heated up to 400° C. over a period of 2.5 hours, held at 400° C. for 2 hours and slowly cooled. Thus, a magnetic core D was prepared.

Magnetic Core E

The above-mentioned roll was subjected to only annealing treatment to prepare a magnetic core E.

Magnetic core losses of the magnetic cores prepared above were measured under the conditions of a frequency of 100 KHz and a magnetic flux density of 0.1 T. In order to examine load dependence of the magnetic core loss, a load of 1 kgf was applied to the magnetic core in the direction of a diameter of the magnetic core. The magnetic core losses under a load and the magnetic core losses without load are set forth in Table 16.

adhesive resin composition for a magnetic core according to the invention can solve various problems which cannot be solved by the varnish of the prior technique, such as a problem that an insulting coating film cannot be formed on the surface of the magnetic core, a working or environmental problem brought about by the use of an organic solvent, a problem of stability of the varnish to heat and elapse of time, and a problem of sagging. By the use of the adhesive resin composition of the invention, a magnetic core whose outer surface has been coated without handling brittle ribbon to thereby impart insulating properties and shape retention properties to the magnetic core after annealing heat treatment can be efficiently produced without using an organic solvent.

TABLE 16

|  | Ex. 46<br>Magnetic core A | Ex. 47<br>Magnetic core B | Comp. Ex. 18<br>Magnetic core C | Comp. Ex. 19<br>Magnetic core D | Comp. Ex. 20<br>Magnetic core E |
|---|---|---|---|---|---|
| Resin in adhesive resin composition | thermoplastic polyimide powder | Thermoplastic polyimide powder | epoxy resin | siloxane-modified polyimide | — |
| Elastic modulus (MPa) | 2200 | 2200 | 3~500 | 150 | — |
| Glass transition temperature (° C.) | 230 | 230 | 50 | 300 | — |
| Viscosity (350° C., Pa · s) | 3000 | 3000 | —*) | 6000 | — |
| 5% decrease temperature (° C.) | 550 | 550 | 330 | 570 | — |
| Coating property adjusting agent | water | water | furfuryl alcohol | water | — |
| Filler | Aerosil | Aerosil | none | none | — |
| Magnetic core Metal | Fe-based amorphous metal | Fe-based amorphous metal | Fe-based amorphous metal | Fe-based amorphous metal | Fe-based amorphous metal |
| Annealing temperature (° C.) | 400 | 400 | 400 | 400 |  |
| Magnetic core loss (W/kg) | 60 | 50 | 120 | 50 | 45 |
| Magnetic core loss under a load (W/kg) | 63 | 58 | 125 | 85 | 90 |

*)The resin was decomposed before the temperature became 350° C.

Figure 4:
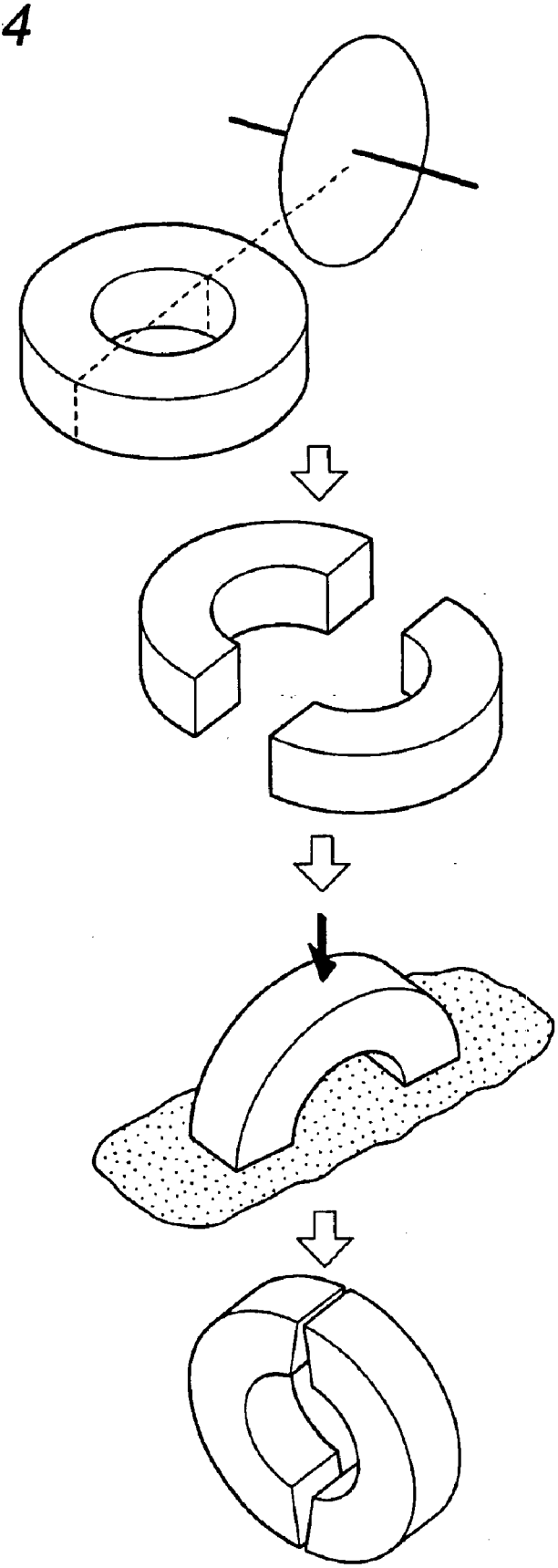
FIG. 4 is a view showing an example of a procedure of machining of a magnetic core.

The magnetic cores prepared above can be used as they are, or they can be cut in halves by a cutting device equipped with a rotary grinding stone as shown in FIG. 4, followed by abrading each cut surface by an abrasion device with applying a load. The magnetic cores obtained above were cut and abraded as described above, and the abraded cut surfaces were observed. As a result, the magnetic core D had large gaps between the amorphous alloy thin strips, and the gaps between the amorphous alloy thin strips of the magnetic core A and the magnetic core B were smaller than the gaps between the amorphous alloy thin strips of the magnetic core C. In case of cut cores, the above-mentioned machining is usually carried out, and if the clearance between the cut surfaces is large, leakage of magnetic flux occurs, and the magnetic permeability and the magnetic core loss of the magnetic core become worse.

INDUSTRIAL APPLICABILITY

The magnetic core according to the invention is a magnetic core whose outer surface has been coated without handling brittle ribbon to thereby impart insulating properties and shape retention properties to the magnetic core after annealing heat treatment, and such a magnetic core could not be accomplished by the prior technique using a varnish. The

What is claimed is:

1. A magnetic core comprising a core material made of a laminate of an amorphous alloy ribbon and a resin-containing coated material with which at least a part of an outer surface of the core material is coated, wherein the resin-containing coated material formed on the outer surface of the core material has a thickness of not less than 10 μm, and a resin for constituting the resin-containing coated material has a tensile strength, as measured at 30° C. after annealing of 365° C. and 2 hours in a nitrogen atmosphere, of not less than 30 MPa and has a loss in weight, due to thermal decomposition after annealing of 365° C. and 2 hours in a nitrogen atmosphere, of not more than 2% by weight.

2. The magnetic core as claimed in claim 1, wherein the resin for constituting the resin-containing coated material is one or more thermoplastic resins selected from a polyimide resin, a polyether imide resin, a polyamide-imide resin, a polyamide resin, a polysulfone resin and a polyether ketone resin.

3. The magnetic core as claimed in claim 1, wherein the resin for constituting the resin-containing coated material is one or more thermoplastic resins selected from resins having, in their main chain skeletons, recurring units represented by the following formulas (1) to (10):

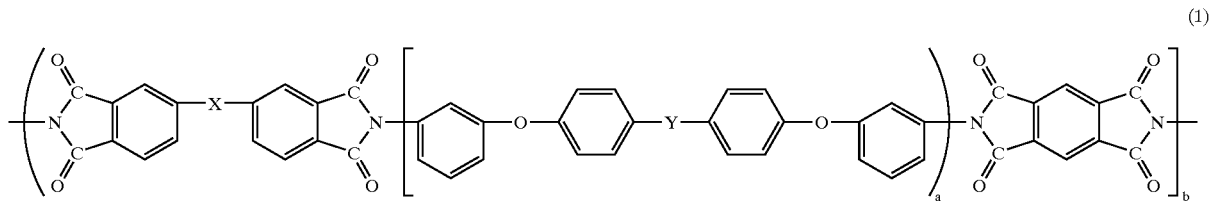
(1)

wherein a and b are numbers satisfying the conditions of a+b=1, $0 \leq a \leq 1$ and $0 \leq b \leq 1$, and X and Y are each independently a bond group capable of forming one bond selected from the group consisting of a direct bond, an ether bond, an isopropylidene bond, a sulfide bond, a sulfone bond and a carbonyl bond and may be the same or different;

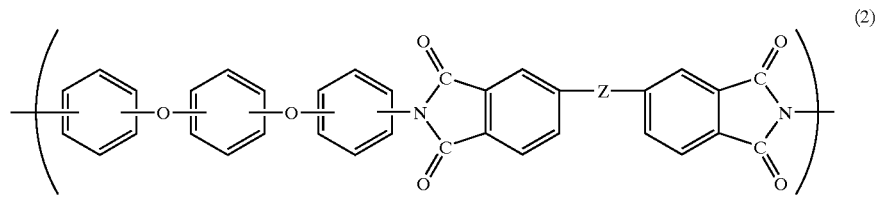
(2)

wherein Z is a bond group selected from the group consisting of a direct bond, an ether bond, an isopropylidene bond, a sulfide bond, a sulfone bond and a carbonyl bond;

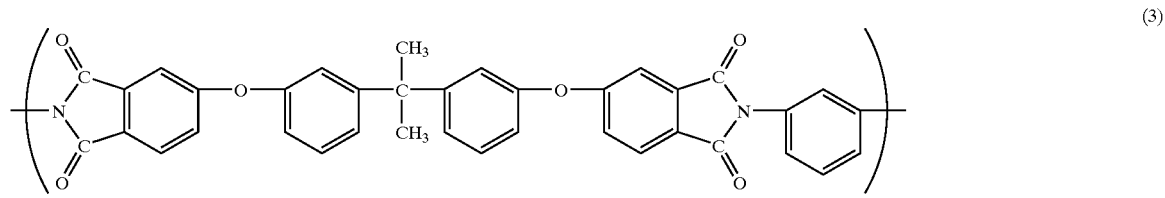
(3)

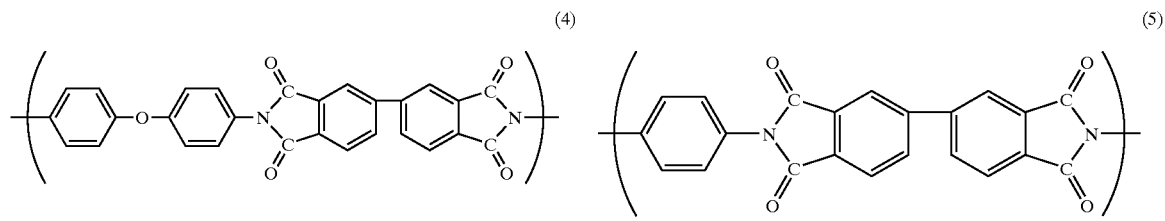
(4) (5)

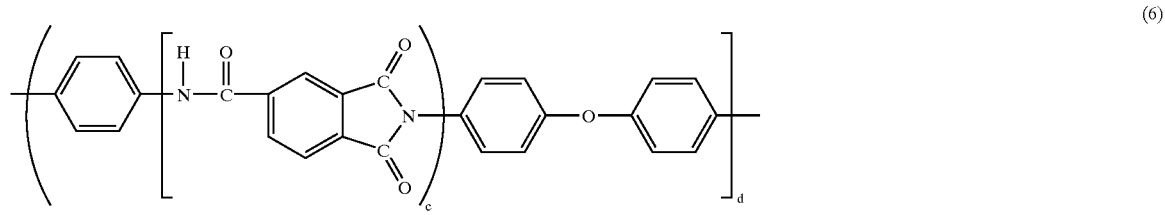
(6)

wherein c and d are numbers satisfying the conditions of c+d=1, 0≦c≦1 and 0≦d≦1;

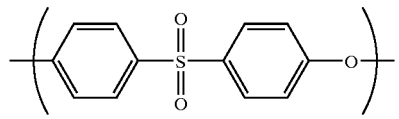
(7)

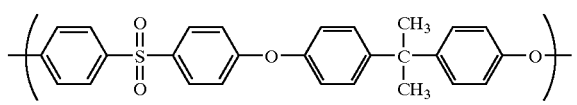
(8)

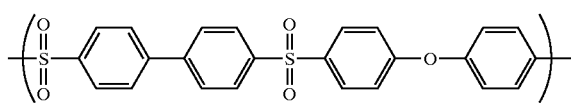
(9)

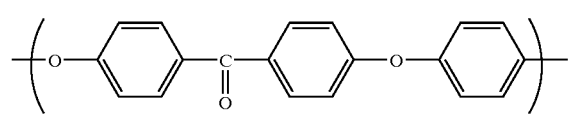
(10)

4. A magnetic core comprising a core material made of a laminate of an amorphous alloy ribbon and a resin-containing coated material with which at least a part of an outer surface of the core material is coated, wherein an area of not more than 10% of the whole surface area of the amorphous alloy ribbon is coated with the resin-containing coated material, and a resin for constituting the resin-containing coated material has a tensile strength, as measured at 30° C. after annealing of 365° C. and 2 hours in a nitrogen atmosphere, of not less than 30 MPa and has a loss in weight, due to thermal decomposition after annealing of 365° C. and 2 hours in a nitrogen atmosphere, of not more than 2% by weight.

5. The magnetic core as claimed in claim 4, wherein the resin for constituting the resin-containing coated material is one or more thermoplastic resins selected from the group consisting of a polyimide resin, a polyether imide resin, a polyamide-imide resin, a polyamide resin, a polysulfone resin and a polyether ketone resin.

6. The magnetic core as claimed in claim 4, wherein the resin for constituting the resin-containing coated material is one or more thermoplastic resins selected from resins having, in their main chain skeletons, recurring units represented by the following formulas (1) to (10):

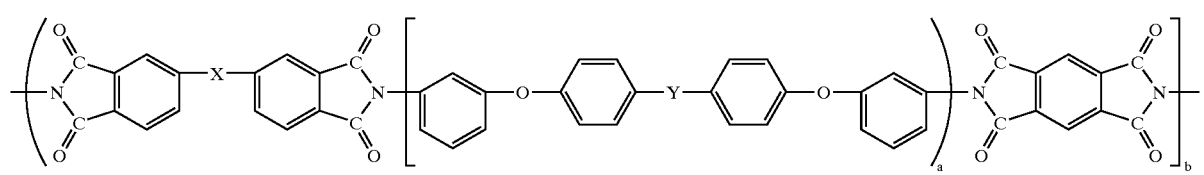
(1)

wherein a and b are numbers satisfying the conditions of a+b=1, 0≦a≦1 and 0≦b≦1, and X and Y are each independently a bond group capable of forming one bond selected from the group consisting of a direct bond, an ether bond, an isopropylidene bond, a sulfide bond, a sulfone bond and a carbonyl bond and may be the same or different;

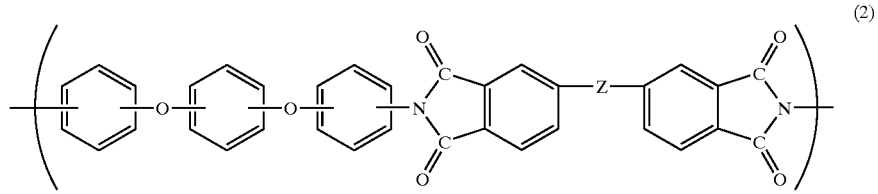
(2)

wherein Z is a bond group selected from the group consisting of a direct bond, an ether bond, an isopropylidene bond, a sulfide bond, a sulfone bond and a carbonyl bond;

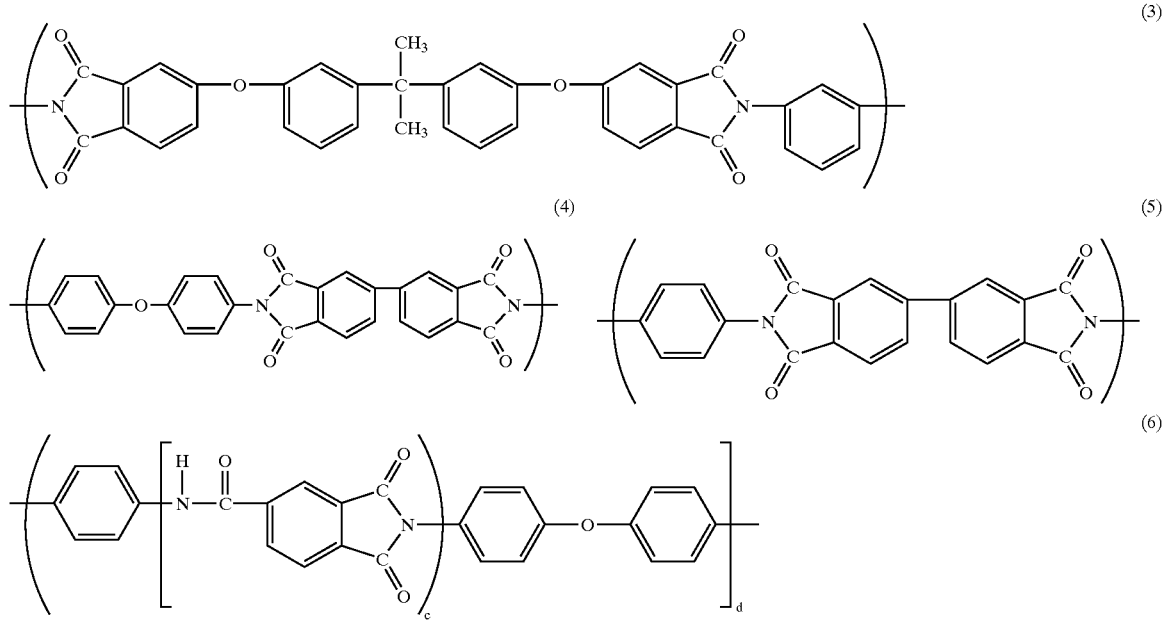

wherein c and d are numbers satisfying the conditions of c+d=1, 0≦c≦1 and 0≦d≦1;

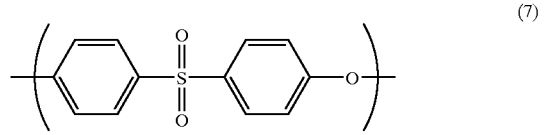

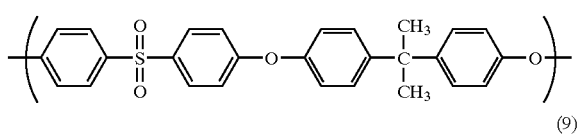

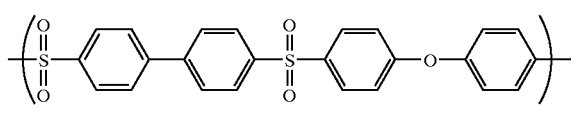

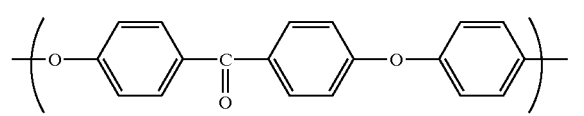

7. An adhesive resin composition for a magnetic core, containing particles of a resin, wherein the resin has both of the following two properties:

(1) the resin has a tensile strength, as measured at 30° C. after annealing of 365° C. and 2 hours in a nitrogen atmosphere, of not less than 30 MPa and has a loss in weight, due to thermal decomposition after annealing of 365° C. and 2 hours in a nitrogen atmosphere, of not more than 2% by weight; and (2) the resin is a thermoplastic resin and has a melt viscosity at 365° C. of 20 to 50000 Pa·s.

8. The adhesive resin composition for a magnetic core as claimed in claim 7, containing a liquid which does not substantially dissolve the resin contained in the composition.

9. The adhesive resin composition for a magnetic core as claimed in claim 8, wherein the liquid is at least one liquid selected from the group consisting of water, methanol and ethanol.

10. The adhesive resin composition for a magnetic core as claimed in claim 7, wherein the resin is one or more thermoplastic resins selected from the group consisting of a polyimide resin, a polyether imide resin, a polyamide-imide resin, a polyamide resin, a polysulfone resin and a polyether ketone resin.

11. The adhesive resin composition for a magnetic core as claimed in claim 10, wherein the resin is one or more thermoplastic resins selected from resins having, in their main chain skeletons, recurring units represented by the following formulas (1) to (10):

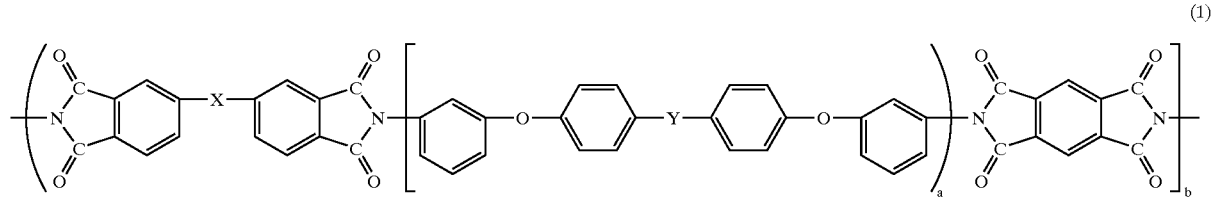

wherein a and b are numbers satisfying the conditions of a+b=1, 0≦a≦1 and 0≦b≦1, and X and Y are each independently a bond group capable of forming one bond selected from the group consisting of a direct bond, an ether bond, an isopropylidene bond, a sulfide bond, a sulfone bond and a carbonyl bond and may be the same or different;

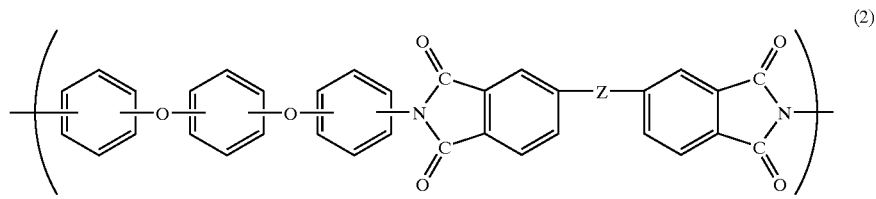

(2)

wherein Z is a bond group selected from the group consisting of a direct bond, an ether bond, an isopropylidene bond, a sulfide bond, a sulfone bond and a carbonyl bond;

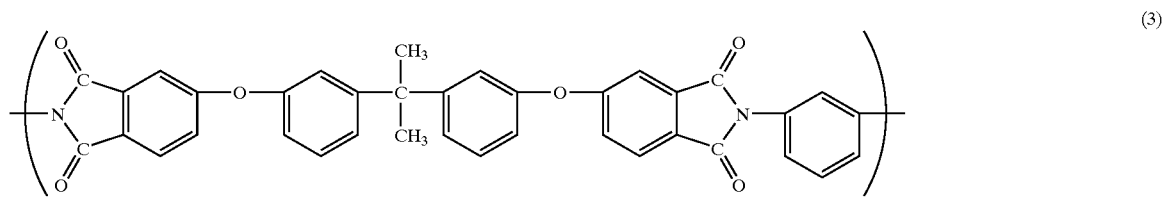

(3)

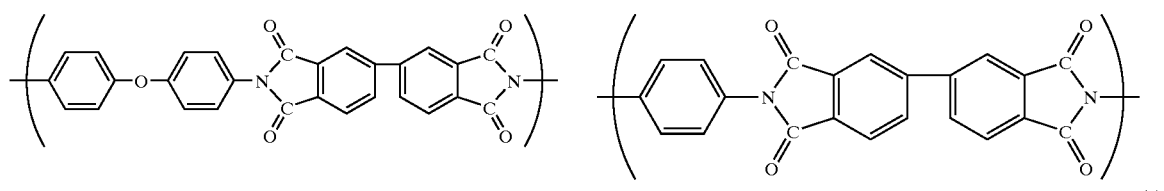

(4) (5)

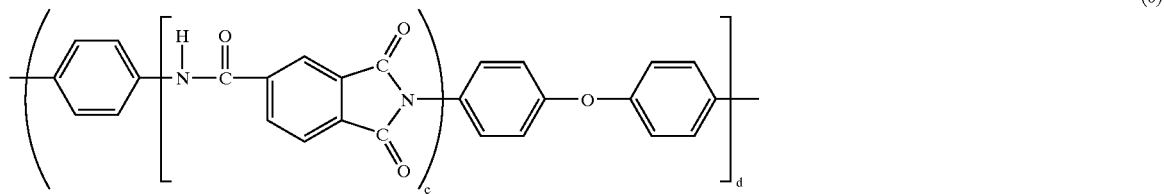

(6)

wherein c and d are numbers satisfying the conditions of c+d=1, 0≦c≦1 and 0≦d≦1;

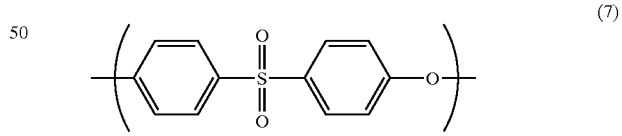

(7)

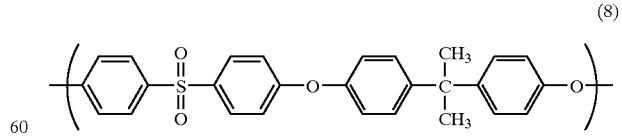

(8)

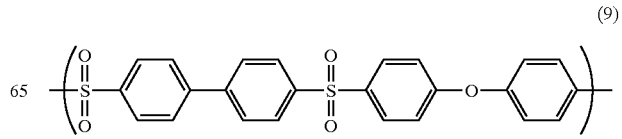

(9)

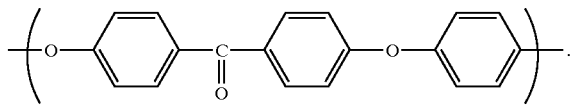

(10)

12. The adhesive resin composition for a magnetic core as claimed in claim 7, containing particles of a resin and particles of an inorganic substance, wherein the particles of a resin and the particles of an inorganic substance satisfy the following mathematical formula (A):

$$0.05 \leq [(Sp \cdot Cp)/(Sf \cdot Cf)] \leq 50 \quad (A)$$

wherein Sp and Sf are a surface area ($m^2/g$) of the particles of a resin and a surface area ($m^2/g$) of the particles of an inorganic substance based on unit weight, respectively, and Cp and Cf are a content (% by weight) of the particles of a resin and a content (% by weight) of the particles of an inorganic substance in the composition, respectively.

13. A magnetic core produced by the use of the adhesive resin composition of any one of claims 7 to 12.

14. A process for producing a magnetic core, comprising providing the adhesive resin composition of any one of claims 7 to 12 to a core material made of a laminate of an amorphous alloy ribbon having been not subjected to annealing heat treatment, and then performing annealing heat treatment, wherein the adhesion coating of the core material with the adhesive resin composition and the annealing heat treatment are carried out in the same step.

* * * * *